United States Patent
Cevik et al.

(10) Patent No.: US 12,355,077 B2
(45) Date of Patent: Jul. 8, 2025

(54) NANOCOMPOSITE ELECTRODE

(71) Applicant: Imam Abdulrahman Bin Faisal University, Dammam (SA)

(72) Inventors: Emre Cevik, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 499 days.

(21) Appl. No.: 17/943,861

(22) Filed: Sep. 13, 2022

(65) Prior Publication Data

US 2024/0088371 A1    Mar. 14, 2024

(51) Int. Cl.
| | | |
|---|---|---|
| H01M 4/485 | (2010.01) | |
| H01M 4/02 | (2006.01) | |
| H01M 4/38 | (2006.01) | |
| H01M 4/62 | (2006.01) | |
| H01M 10/36 | (2010.01) | |
| H01M 50/46 | (2021.01) | |

(52) U.S. Cl.
CPC ............. *H01M 4/485* (2013.01); *H01M 4/38* (2013.01); *H01M 4/623* (2013.01); *H01M 4/625* (2013.01); *H01M 10/36* (2013.01); *H01M 50/46* (2021.01); *H01M 2004/021* (2013.01); *H01M 2004/027* (2013.01); *H01M 2004/028* (2013.01)

(58) Field of Classification Search
CPC ..... H01M 2004/021; H01M 2004/028; H01M 4/364; H01M 4/485; H01M 10/36
See application file for complete search history.

(56) References Cited

U.S. PATENT DOCUMENTS

| | | | |
|---|---|---|---|
| 9,780,412 B2 | 10/2017 | Adams et al. | |
| 10,826,113 B2 | 11/2020 | Zhamu et al. | |
| 11,258,070 B2 | 2/2022 | House et al. | |
| 11,328,877 B2 | 5/2022 | Bozkurt et al. | |
| 2019/0148779 A1* | 5/2019 | Wang ................ | H01M 10/36 429/231.5 |
| 2021/0403341 A1* | 12/2021 | Huang ................ | C01G 31/00 |

FOREIGN PATENT DOCUMENTS

| | | |
|---|---|---|
| CN | 110391415 A | 10/2019 |
| CN | 111509218 A | 8/2020 |
| CN | 114094091 A | 2/2022 |

OTHER PUBLICATIONS

Kaveevivitchai, Watchareeya; and Manthiram, Arumugam. "High-Capacity Zinc-Ion Storage in an Open-Tunnel Oxide for Aqueous and Nonaqueous Zn-Ion Batteries." Journal of materials chemistry. A, Materials for energy and sustainability 4.48 (2016): 18737-8741. Web. (Year: 2016).*

(Continued)

*Primary Examiner* — Susan D Leong
*Assistant Examiner* — Timothy G Hemingway
(74) *Attorney, Agent, or Firm* — Oblon, McClelland, Maier & Neustadt, L.L.P.

(57) ABSTRACT

A nanocomposite electrode including a substrate, a binding compound, a conductive additive, and zinc doped molybdenum vanadium oxide (ZMV) nanorods. The substrate is at least partially coated on a first side with a mixture including the ZMV nanorods, the binding compound, and the conductive additive. A battery including the nanocomposite electrode.

18 Claims, 19 Drawing Sheets

(56) References Cited

OTHER PUBLICATIONS

Sambandam, Balaji et al. âAqueous Rechargeable Zn-Ion Batteries: An Imperishable and High-Energy Zn2V2O7 Nanowire Cathode through Intercalation Regulation.â Journal of materials chemistry. A, Materials for energy and sustainability 6.9 (2018): 3850â3856. Web. (Year: 2018).*

Li, Xuerong et al. âRecent Advances of Vanadium-Based Cathode Materials for Zinc-Ion Batteries.â Chinese chemical letters 32.12 (2021): 3753â3761. Web. (Year: 2021).*

Lakhnot, Aniruddha S et al. âReversible and Rapid Calcium Intercalation into Molybdenum Vanadium Oxides.â Proceedings of the National Academy of Sciences—PNAS 119.30 (2022): 1â10. Web. (Year: 2022).*

"Morphology Engineering of Silicon Nanoparticles for Better Performance in Li-Ion Battery Anodes." Nanoscale advances (2020): n. pag. Web. (Year: 2020).*

Qu, et al. ; Phase engineering of Mo—V oxides molecular sieves for zinc-ion batteries ; Science China Materials 65(4) ; pp. 939-946 ; Nov. 12, 2021 ; 8 Pages.

Zhuang, et al. ; Construction of molybdenum vanadium oxide/nitride hybrid nanoplate arrays for aqueous zinc-ion batteries and reliable insights into the reaction mechanism ; Journals of Materials Chemistry A, Issue 37, 2021 ; Abstract Only ; 2 Pages.

\* cited by examiner

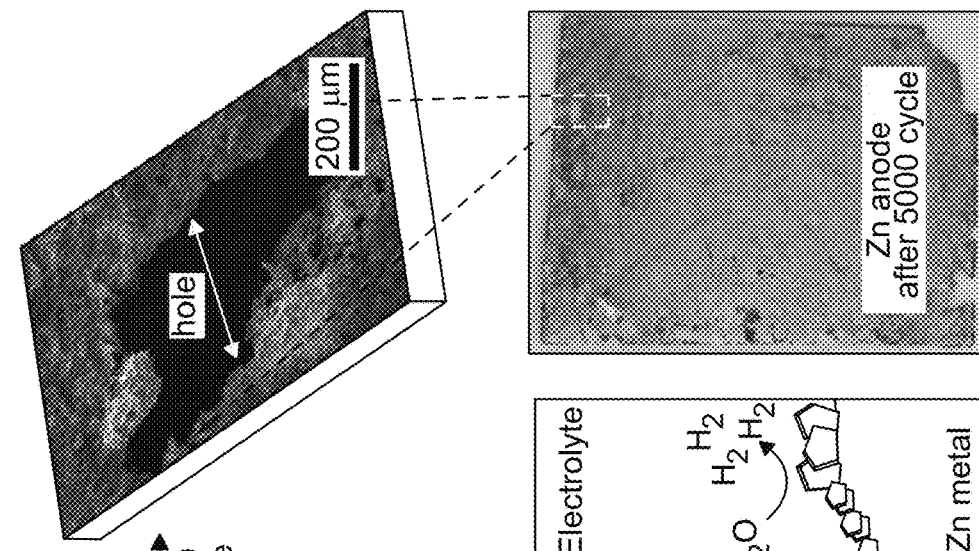
FIG. 6C  FIG. 6B  FIG. 6A
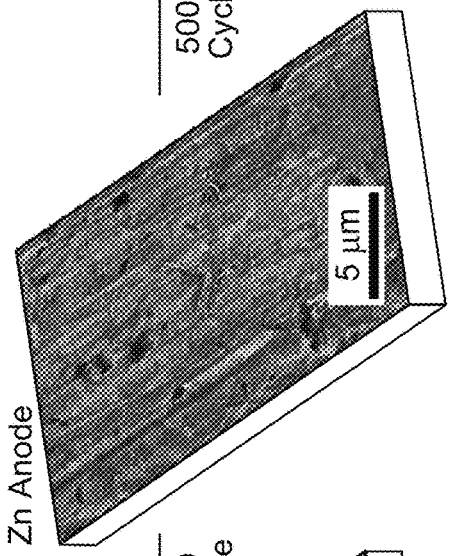
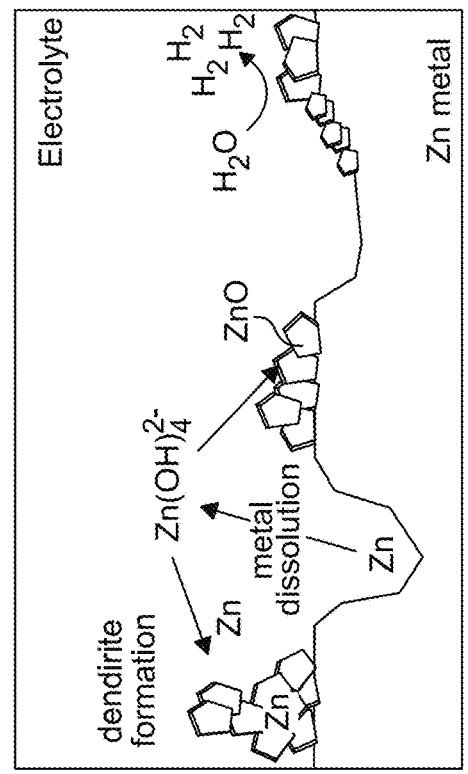
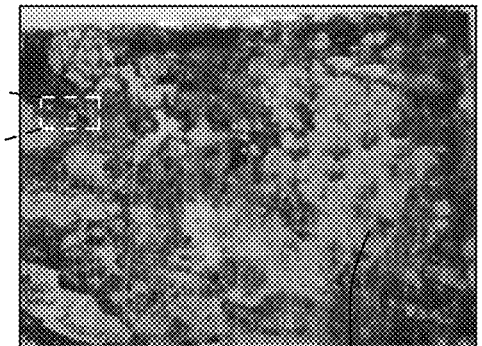
FIG. 6F  FIG. 6E  FIG. 6D

NANOCOMPOSITE ELECTRODE

BACKGROUND

Technical Field

The present disclosure is directed to an electrode, particularly to a nanocomposite electrode, and a battery including the electrode.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electrochemical energy storage systems, such as rechargeable battery technologies, are essential for substantial advancements in industrial fields, including electric vehicles, portable electronic devices, and renewable energy. Nonaqueous lithium-ion batteries (LIBs) are commonly used in portable devices due to their high energy density, long cycle life, and flexible and lightweight design. However, growing concerns about limited lithium resources, safety issues, and high cost limit their progress for large-scale applications. Rechargeable aqueous zinc-ion batteries (ZIBs) have attracted attention as the next generation of high-performance and safe energy storage systems. In addition, zinc is comparatively abundant and environmentally benign in contrast to alkaline metals, offering a long-term, cost-effective alternative for energy storage applications.

However, the lack of appropriate cathode materials that match Zn anodes with high capacity has limited the applications of ZIBs. Aqueous ZIBs with layered metal vanadates ($M_x V_m O_n$, M=metal cations) with an open framework crystal structure, where metal cations embedded in the $V_m O_n$ layers perform as strong pillars to expand the interlayer spacing for fast reversible $Zn^{2+}$ intercalation/deintercalation have been investigated (Yang, Y., Tang, Y., Fang, G., Shan, L., et al., $Li^+$ intercalated $V_2O_5 \cdot nH_2O$ with enlarged layer spacing and fast ion diffusion as an aqueous zinc-ion battery cathode. Energy Environ. Sci. 2018, 11, 3157-3162, and Xia, C., Guo, J., Li, P., Zhang, X., et al., Highly Stable Aqueous Zinc-Ion Storage Using a Layered Calcium Vanadium Oxide Bronze Cathode. Angew. Chem. Int. Ed. 2018, 57, 3943-3948.). Due to their layered and tunnel polymorphs, vanadium oxides provide large spatial dimensions for easy Zn intercalation and de-intercalation.

U.S. Ser. No. 10/826,113B2 discloses a cathode comprising two cathode active materials, a zinc ion intercalation compound, and a surface-mediating material. The zinc ion intercalation compound contains an oxide of molybdenum, or vanadium in a nanowire, nano-disc, nano-ribbon, or nano platelet form with graphene. U.S. Pat. No. 9,780,412B2 discloses a cathode based on a layered structure of vanadium/molybdenum oxides, with neutral/cationic/anionic species and/or water molecules inserted into the interlayers, for zinc ion storage. Complicated design of the active materials in the cathodes also limits the device performance and applicability on a larger scale. Improving the performance of cathode materials remains a significant challenge because they are inextricably linked to cycle stability, reversible capacity, performance rate, lifespan, and operating voltage.

Further development of new materials with improved properties and morphology is required to achieve high performance of the ZIBs. Accordingly it is one object of the present disclosure to provide an electrode including zinc. It is another object of the present disclosure to provide a cathode including zinc. It is another object of the present disclosure to provide a cathode including a zinc nanocomposite. It is another object of the present disclosure to provide a cathode including a zinc nanocomposite with a high capacitance.

SUMMARY

The present disclosure presents a nanocomposite electrode including a substrate, a binding compound, a conductive additive, and zinc doped molybdenum vanadium oxide (ZMV) nanorods. The substrate is at least partially coated on a first side with a mixture comprising the ZMV nanorods, the binding compound, and the conductive additive.

In an embodiment, the ZMV nanorods have an average diameter of 10-150 nm.

In an embodiment, the ZMV nanorods have an average diameter of 50-100 nm.

In an embodiment, the ZMV nanorods have a length of at least 0.5 um.

In an embodiment, the ZMV nanorods have a length of 0.5-100 um.

In an embodiment, the ZMV nanorods have 10-20 atomic percent (at %) Zn, 15-25 at % Mo, 20-30 at % V, and 40-50 at % O, based on the total number of atoms in the ZMV nanorods.

In an embodiment, a length of the ZMV nanorods are oriented parallel to each other.

In an embodiment, the mixture comprises, 1-20 wt. % binding compound, 10-30 wt. % conductive additive, and 60-80 wt. % of the ZMV nanorods, based on the total weight of the ZMV nanorods, the binding compound, and the conductive additive.

In an embodiment, the substrate is made from at least one of the materials selected from the group consisting of stainless steel, aluminum, nickel, copper, platinum, zinc, tungsten, and titanium.

In an embodiment, the binding compound is at least one selected from the group consisting of polyvinylidene fluoride and N-methyl pyrrolidone.

In an embodiment, the conductive additive is at least one selected from the group consisting of graphite, activated carbon, reduced graphene oxide, carbon nanotubes, carbon nanofibers, and carbon black.

The present disclosure also presents a battery including the nanocomposite electrode, an electrolyte, and an anode. The nanocomposite electrode is a cathode, the electrolyte is an aqueous solution of a zinc salt, and the anode is zinc metal. The nanocomposite electrode and anode form a layered structure with the first side of the nanocomposite electrode facing inward towards the anode, and the electrolyte is between and in direct contact with the first side of the nanocomposite electrode and the anode to form the battery.

In an embodiment, the electrolyte has a molarity of 0.1-3 M in the aqueous solution.

In an embodiment, the electrolyte is at least one zinc salt selected from the group consisting of zinc sulfate, zinc carbonate, zinc nitrate, zinc acetate, and zinc halide.

In an embodiment, the battery further includes a separator between the first side of the nanocomposite electrode and the anode, the separator includes the electrolyte.

In an embodiment, the separator is selected from the group consisting of a glass fiber separator, a polyethylene separator, a polypropylene separator and a polyester fiber separator.

In an embodiment, the battery has a gravimetric capacitance of 400-500 mAh/g at 0.1-1 A/g.

In an embodiment, at least 90% of the gravimetric capacitance is maintained after 5,000 charge-discharge cycles in the battery.

In an embodiment, a battery cell includes 2-10 of the batteries connected in parallel and/or series.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 6A shows an SEM image of a Zn anode after 100 cycles in a charged state, according to certain embodiments;

FIG. 6B shows an SEM image of a Zn anode before use, according to certain embodiments;

FIG. 6C shows an SEM image of a Zn anode after 5,000 cycles after it was cleaned, according to certain embodiments;

FIG. 6D shows a digital photograph of a Zn anode after 100 cycles, according to certain embodiments;

FIG. 6E shows a schematic representation of dendrite formation and anode dissolution of a Zn anode, according to certain embodiments;

FIG. 6F shows a digital photograph of a Zn anode after 5,000 cycles, according to certain embodiments;

DETAILED DESCRIPTION

Figure 1A:
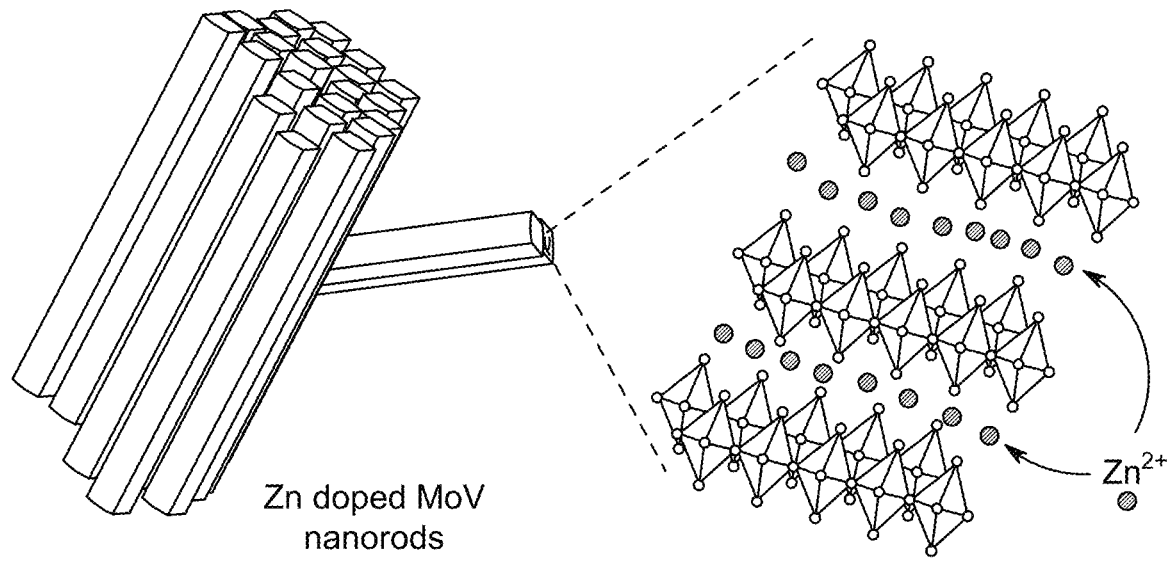
FIG. 1A shows a schematic structural representation of the zinc doped molybdenum vanadium oxide (ZMV) nanorods and electrolyte interaction in a battery according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

As used herein, "electrode substrate" or "substrate" refers to a substrate including a conducting material, which may be, but is not in any manner limited to, metals, metal alloys, and other conducting materials.

As used herein, "electrolyte" refers to substances that conduct electric current because of dissociation of the electrolyte into positively and negatively charged ions.

As used herein, "binding compound" or "binding agent" or "binder" refers to compounds or substances which holds or draws other materials together to form a cohesive whole mechanically, chemically, by adhesion or cohesion.

As used herein, "conductive additive" refers to substances or compounds or materials which when added to another substance or compound or material of low electrical conductivity, increase the conductivity thereof.

As used herein, a "voltammogram" is a graph that can be drawn after an electrochemical experiment. This graph has a typical, recognizable form in which the electron flow (current: I) is measured in Volts against the potential (E).

As used herein, "amount" refers to the level or concentration of one or more reactants, catalysts, or materials present in a reaction mixture.

As used herein, "nanocomposite" refers to a composite material that has at least one component with a grain size measured in nanometers.

As used herein, "anode" refers to an electrode of a polarized electrical device through which the conventional current enters the device.

As used herein, "cathode" refers to an electrode of the device through which conventional current leaves the device.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

Embodiments of the present disclosure are directed to a zinc doped molybdenum-vanadium (ZMV) nanocomposite or nanocomposites. The nanocomposites of the present disclosure can be used as an electrode material, preferably a cathode material, in electrochemical energy storage devices. The nanocomposite electrodes are described according to physical and electrochemical performance. As described herein in certain embodiments the electrodes demonstrate high gravimetric specific capacitance across a wide operation potential of 0-2 V, opening potential application in a variety of energy storage devices.

Zinc-Doped Molybdenum-Vanadium (ZMV) Nanomaterial

In an embodiment, the nanocomposite electrode comprises a substrate, a ZMV nanomaterial, a binding compound, and a conductive additive. In an embodiment, the ZMV nanomaterial has a spherical, triangular, cubic, hexagonal, oval, prism, rod, star, needle, octahedral, pentagonal, flower, and/or platelet shape. In a preferred embodiment, the ZMV nanomaterial has a rod shape, referred to throughout as nanorods. In an embodiment, the nanorods have a circular cross section. In an embodiment, the nanorods have a square cross section. In an embodiment, the rods are not hollow. In an embodiment, the ZMV nanorods have an average diameter of 1-500 nm, preferably 10-450 nm, 20-400 nm, 30-350 nm, 40-300 nm, 50-250 nm, or 100-200 nm. In an embodiment, the ZMV nanorods have an average diameter of 10-150 nm. In an embodiment, the ZMV nanorods have an average diameter of 50-100 nm. In an embodiment, the ZMV nanorods are aggregated forming aggregates have an average size greater than 1 um, preferably 1 to 100 um, 10-90 um, 20-80 um, 30-70 um, 40-60 um, or approximately 50 um.

In an embodiment, the ZMV nanorods have a length of at least 0.5 um, preferably 0.5-100 um, 10-90 um, 20-80 um, 30-70 um, 40-60 um, or approximately 50 nm. In an embodiment, the ZMV nanorods are oriented parallel to each other. In an embodiment, the ZMV nanorods are oriented randomly with respect to each other, in other words they do not have a specific orientation. In an embodiment, the ZMV nanorods are oriented perpendicular to the substrate. In an embodiment, the ZMV nanorods are oriented parallel to the substrate. In an embodiment, the ZMV nanorods are randomly oriented on the substrate. In some embodiments, the ZMV nanorods have a high crystallinity. In some embodiments, the ZMV nanorods have a high crystallinity, where at least 80% of the nanorods are crystalline, preferably 85%, 90%, 95%, or 100%.

In an embodiment, the ZMV nanorods have a lattice d-spacing of 0.1-1 nm, preferably 0.2-0.9 nm, 0.3-0.8 nm, 0.4-0.7 nm, or 0.5-0.6 nm. In an embodiment, the ZMV nanorods include zinc, molybdenum, vanadium, and oxygen. In an embodiment, the nanorods include zinc, molybdenum, vanadium, oxygen, iron, cobalt, nickel, manganese, and/or tungsten. In an embodiment, the ZMV nanorods consist of zinc, molybdenum, vanadium, and oxygen. In an embodiment, the ZMV nanorods have 10-20 atomic percent (at %) Zn, 15-25 at % Mo, 20-30 at % V, and 40-50 at % O, based on the total number of atoms in the ZMV nanorods. In an embodiment, the ZMV nanorods have 12-15 at % Zn, 17-20 at % Mo, about 23-27 at % V, and 43-47 at % O, based on the total number of atoms in the ZMV nanorods. In an embodiment, the ZMV nanorods have 13-14 at % Zn, 18-19 at % Mo, about 24-26 at % V, and 44-46 at % O, based on the total number of atoms in the ZMV nanorods. The elements are homogenously distributed throughout the ZMV nanorods.

In a preferred embodiment, the ZMV nanorods have an octahedral or tetrahedral bonding geometry. In a preferred embodiment, the ZMV nanorods have an octahedral Mo—V geometry and after doping with Zn it remains as octahedral phase. In an embodiment, the Mo, V, and Z are attached through bridging oxygen atoms. In an embodiment, Mo is present in a $Mo^{2+}$, $Mo^{4+}$, $Mo^{5+}$, and/or $Mo^{6+}$ oxidation state. In an embodiment, V is present in a $V^{2+}$, $V^{3+}$, $V^{4+}$, and/or $V^{5+}$ oxidation state. In an embodiment, Zn is present in a Zn, $Zn^+$ and/or $Zn^{2+}$ oxidation state.

In some embodiments, the surface of the nanorods have hydroxyl groups, carbonate groups, nitrate groups, sulfate groups, acetate groups, and/or halogens. In a preferred embodiment, the surface of the nanorods have hydroxyl (—OH) groups. The hydroxyl groups on the surface can be used to otherwise modify the surface of the nanorods. In an embodiment, the nanorods are modified with a group through hydrogen bonding, covalent bonding, and/or electrostatic interactions. In an embodiment, the surface of the nanorods are modified with a ligand. In an embodiment, the ligand may include but is not limited to cetyltri-methylammonium bromide, hexadecylamine, oleyamine, sodium citrate, 2-mercaptoethanol, acetic acid, acrylic acid, ammonium thiocyanate, ethanedithiol, and polyethylene glycol. In an embodiment, the ZMV nanorods are not modified with a ligand.

In some embodiments, the ZMV nanorods are made by a hydrothermal method. The order in which the method is described is not intended to be construed as a limitation, and any number of the described method steps can be combined in any order to implement the method. Additionally, individual steps may be removed or skipped from the method without departing from the spirit and scope of the present disclosure. In some embodiments, the method includes dissolving a zinc salt, a vanadium salt, and a molybdenum salt in a protic solvent to form a first mixture. Protic solvents have a hydrogen bound to an oxygen, nitrogen, or fluoride such as but not limited to water, methanol, ethanol, acetic acid, butanol, and isopropanol. In an embodiment, the protic solvent is water. In one embodiment, the molybdenum salt is selected from a group consisting of sodium molybdate, ammonium molybdate, diammonium molybdate, iron (II) molybdate, ferric molybdate, nickel molybdate, cobalt molybdate, manganese molybdate, and hydrates thereof. In one embodiment, the molybdenum salt may be ammonium molybdate tetrahydrate ($(NH_4)_6Mo_7O_{24} \cdot 4H_2O$). In some embodiments, the vanadium salt is ammonium vanadate, sodium vanadate, or vanadium sulfate. In some embodiments, the vanadium salt is ammonium vanadate ($NH_4VO_3$). In some embodiments, the zinc salt is zinc sulfate, zinc halide, zinc nitrate, zinc acetate, and hydrates thereof. In some embodiments, the zinc salt is zinc sulfate ($ZnSO_4 \cdot 7H_2O$). The first mixture may be stirred by any methods known in the art to form a homogeneous mixture.

The homogeneous mixture is then heated to 100-300° C., preferably 150-250° C., or approximately 210° C., for 24-72 hours, preferably 30-60 hours, or 40-50 hours to form a precipitate. In some embodiments, the homogeneous mixture is heated in a stainless steel autoclave. The precipitate is then separated by any method in the art including filtration, washed with water, and then dried at a temperature of 50-100° C., preferably 60-90° C., or 70-80° C.

Nanocomposite Electrode

In some embodiments, the substrate is at least partially coated with a mixture of the ZMV nanorods, the binding compound, and the conductive additive. In an embodiment, the mixture comprises 1-20 wt. %, preferably 5-15 wt. % or approximately 10 wt. % binding compound, 10-30 wt. %, preferably 15-25 wt. %, or approximately 20 wt. % conductive additive, and 60-80 wt. % ZMV nanorods, preferably 65-75 wt. %, or approximately 70 wt. % ZMV nanorods, based on the total weight of the ZMV nanorods, the binding compound, and the conductive additive.

In some embodiments, the conductive additive includes a conductive material and a polymer. The conductive additive allows for improved adhesion between the mixture and the electrode substrate. This intimate connection results in lower electrical resistance and, accordingly, lower impedance for the nanocomposite electrode and its associated device. In one embodiment, the conductive additive is at least one selected from the group consisting of graphite, activated carbon, reduced graphene oxide, carbon nanotubes, carbon nanofibers, and carbon black. In a preferred embodiment, the conductive additive is carbon black.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is selected from the group consisting of a fluorine containing polymer including polyvinylidene fluoride and N-methyl pyrrolidone (NMP). In a preferred embodiment, the binding compound is PVDF.

In an embodiment, the substrate may be a material made from one or more of metals such as, stainless steel, aluminum, nickel, copper, platinum, zinc, tungsten, and titanium. In an embodiment, the substrate may be a mesh, a foil, or a thicker substrate with no holes. In an embodiment, the substrate is aluminum foil. In one embodiment, the coating is performed using an automatic coating machine. In an embodiment, the coating is less than 10 um, preferably 0.1-10 um, 0.5-5 um, or 1-2 um thick. In an embodiment, at least 10%, preferably 20%, 30%, 40%, 50%, 60%, 70%, 80%, 90%, or 100% of a first side of the substrate is coated with the mixture of the ZMV nanorods, the binding compound, and the conductive additive. In an embodiment, both sides of the substrate are at least partially coated with the mixture of the ZMV nanorods, the binding compound, and the conductive additive.

The nanocomposite electrode can be made by any method known in the art. In an embodiment, the nanocomposite electrode is made by mixing the binding compound PVDF, conductive additive and ZMV nanorods to form a mixture. In some embodiments, the mixture is stirred at a temperature of 60-100° C., preferably 70-90° C., or approximately 80° C. to form a homogeneous slurry. In some embodiments, the slurry is cast onto the substrate by any method known in the art including, drop casting, spin coating, doctor blading or using an automatic coating instrument. After casting of the slurry, it is dried at a temperature of 60-100° C., preferably 70-90° C., or approximately 80° C., and cut to size by any method known in the art including, scissors, or a pneumatic disk cutter. In an embodiment, a pneumatic disc cutter is used to cut the electrodes into a desired shape and size. In an embodiment, the electrode may be but is not limited to circular, square, rectangular, or triangular. In an embodiment, a side of the electrodes has a length of 0.1 to 10 mm, preferably 1-9 mm, 2-8 mm, 3-7 mm, 4-6 mm, or approximately 5 mm. In an embodiment, the length of each side of the electrode is the same. In an embodiment, the length of each side of the electrode are not the same.

Battery

In an embodiment, a battery including the nanocomposite electrode also includes an electrolyte and an anode. In the battery the nanocomposite electrode acts as the cathode. In the battery, the cathode and anode form a layered structure with the side of the cathode coated with the mixture of the ZMV nanorods, the binding compound, and the conductive additive of the faces inward towards the anode. The electrolyte is between and in direct contact with the first side of the cathode and the anode to form the battery.

In an embodiment, the substrate may be a material made from one or more of metals such as, stainless steel, aluminum, nickel, copper, platinum, zinc, tungsten, and titanium. In an embodiment, the anode is zinc metal. In a preferred embodiment, the anode material matches the dopant of the cathode, i.e. Zn.

In an embodiment, the electrolyte is an aqueous solution of a zinc salt. In an embodiment, the zinc salt is zinc sulfate, zinc carbonate, zinc nitrate, zinc acetate, and/or a zinc halide. In an embodiment, the zinc salt is zinc sulfate. In a preferred embodiment, the electrolyte matches the dopant of the cathode, i.e. Zn. In an embodiment, the zinc salt has a molarity (M) of 0.1-5 M in the aqueous solution, preferably 0.5-4.5 M, 1-4 M, or 2-3 M.

In an embodiment, a separator is soaked in a solution of the electrolyte and then incorporated into the battery. In an embodiment, the separator absorbs and holds the electrolyte solution. The separator is a permeable membrane and prevents direct contact between the anode and cathode, thereby preventing short circuits. The separator can be made from any material known in the art including nonwoven fibers (cotton, nylon, polyesters, glass), polymer films (polyethylene, polypropylene, poly (tetrafluoroethylene), polyvinyl chloride), ceramic and naturally occurring substances (rubber, asbestos, wood). Inn an embodiment, the separator is selected from the group consisting of a glass fiber separator, a polyethylene separator, a polypropylene separator and a polyester fiber separator.

In an embodiment, the battery has a gravimetric capacitance of 400-500 mA/g at 0.1-1 A/g, preferably 410-490 mA/g, 420-480 mA/g, 430-470 mA/g, 440-460 mA/g, or approximately 450 mA/g. In some embodiments, at least 70%, preferably 80%, 90%, 95%, or 98% of the gravimetric capacitance is maintained after 5,000 charge-discharge cycles, preferably 6,000, 7,000, 8,000, 9,000, or 10,000 cycles. In an embodiment, a battery cell includes 2-10, preferably 3-9, 4-8, or 5-7 of the batteries connected in parallel and/or series. In an embodiment, a single battery or a battery cell may be used to power any system known in the art, including but not limited to, a fan, a light, or a cell phone.

As depicted in FIG. 1A, the Zn ion ($Zn^{2+}$) from the electrolyte intercalates between the nanorods. In an embodiment, the nanorods are spaced 0.1-100 nm apart, preferably 0.5-95 nm, 1-90 nm, 5-85 nm, 10-80 nm, 20-75 nm, 25-70 nm, 30-65 nm, 35-60 nm, 40-55 nm, or 45-50 nm. The spacing may be referred to as pores, or that the ZMV nanorods are a porous material. In other words, the pores are outside of the nanorods. In an embodiment, the pores run the length of the nanorods and the pores have a depth of at least 0.5 um, preferably 0.5-100 um, 10-90 um, 20-80 um, 30-70 um, 40-60 um, or approximately 50 nm. In an embodiment, the pores are more shallow and have a depth less than 50 nm, preferably 40 nm, 30 nm, 20 nm, or less than nm. In an embodiment, there is a mixture of shallow (<50 nm) and deep pores (>50 nm) in the electrode. This spacing or pores allows for the $Zn^{2+}$ electrolyte to freely move between the nanorods, increasing the contact surface area and improving the capacity. In a preferred embodiment, the battery includes a zinc doped cathode material, a zinc ion electrolyte, and a zinc metal anode. This allows for reversible and uniform Zn electroplating at the interface of the anode surface, as further described in the examples.

EXAMPLES

The following examples describe and demonstrate a nanocomposite electrode. The examples are provided solely for the purpose of illustration and are not to be construed as limitations of the present disclosure, as many variations thereof are possible without departing from the spirit and scope of the present disclosure.

Materials

Zn metal foil (Sigma Aldrich), Zinc sulfate heptahydrate ($ZnSO_4 \cdot 7H_2O$) (AR, ≥99.0%), Ammonium vanadate (NH4VO3) (AR, ≥99.0%), ammonium molybdate tetrahydrate $(NH_4)_6Mo_7O_{24} \cdot 4H_2O$ (AR, ≥99.0%) were obtained from Sigma Aldrich, whereas 1-methyl-2-pyrrolidone (NMP) was procured from Merck. PVDF (polyvinylidene fluoride, HSV 900) binder for battery electrodes, Timical super C65 conductive carbon (CC) were obtained from MTI (USA).

Example 1: Preparation of Zinc Doped Molybdenum-Vanadium (ZMV) Cathode Material All of the chemical materials were used directly without further purification. The ZMV nanorods were synthesized by a hydrothermal method. 1 mmol of $ZnSO_4 \cdot 7H_2O$, 2 mmol of $NH_4VO_3$, and 0.24 mmol of $(NH_4)_6Mo_7O_{24} \cdot 4H_2O$ were dissolved in 15 mL of deionized (DI) separately, followed by slowly adding the prepared solutions to the zinc solutions. Vigorous stirring for 30 min was applied to obtain a homogeneous mixture. The above solution was transferred into a 100 mL Teflon-lined stainless steel autoclave for 48 h at 210° C. and cooled naturally. The final precipitate was collected and washed with deionized water and ethanol and dried at 60° C. for 8 hours (Sambandam, B., Soundharraj an, V., Kim, S., Alfaruqi, M. H., et al., Aqueous rechargeable Zn-ion batteries: an imperishable and high-energy $Zn_2V_2O_7$ nanowire cathode through intercalation regulation. J. Mater. Chem. A 2018, 6, 3850-3856, incorporated by reference in its entirety).

Example 2: Battery Electrode Preparation

The cathode electrode was produced by dispersing 10% of (w/w) PVDF into 20% (w/w) of conductive carbon (CC), and 70% ZMV nanorods at 80° C. under constant stirring until the formation of homogeneous slurry. The slurry was cast on aluminum foil using an automatic coating instrument (MRX Shenzhen Automation Equipment). After casting the ZMV slurry, it was dried in an oven at 70° C. and finally the prepared cathode sheet was cut with to a die size (15 mm) using a Hi-Throughput Precision Pneumatic Disk Cutter. Battery cells were assembled using the configuration: Zn metal anode/$ZnSO_4$ electrolyte/ZMV cathode, referred to as Zn//$ZnSO_4$//ZMV. The layers of the cell are assembled starting from the zinc metal anode and separated from the cathode with a glass fiber separator saturated with a 1 M ($ZnSO_4$) electrolyte solution.

Example 3: Materials Characterization and Electrochemical Measurements Techniques The morphologies of the samples were investigated directly by scanning electron microscopy (SEM), TESCAN VEGA3, and transmission electron microscopy (TEM), Morgagni 268. Energy-dispersive X-ray spectroscopy (EDX) measurements were carried out by EDAX system. The crystalline structure was examined through X-ray diffraction (XRD, Shimadzu XRD-7000) with monochromatic high-intensity Cu Kα radiation ($\lambda=1.5406$ Å) and $2\theta=10-60°$ by a scan rate of 0.5° $min^{-1}$. X-ray photoelectron spectroscopy (XPS; K Alpha, ThermoFisher) was used to study the surface functionalities.

The cyclic voltammetry (CV) and battery charge-discharge (CD) measurements were carried out to investigate the performance of the batteries (Corrtest electrochemical work-station (CS1034)). The Zn-ion batteries (ZIBs) were fabricated into the split cell assembly using Zn//$ZnSO_4$//ZMV configuration. CD analysis was done at different currents ranging from 0.1 to mA and cut-off voltage was set between 0.4 to 2.0 V. The ZIBs cell was subjected to CV at different scan rates ranging from 0.1 to 10 mV $s^{-1}$.

Example 4: Materials Characterization

FIG. 1A shows a schematic representation of the ZMV nanorod structures and possible interaction with $Zn^{2+}$ ions in the electrolyte. A nanorod stack was obtained after the hydrothermal reaction, which was used as the cathode material in the ZIB assembly. Intercalation of the $Zn^{2+}$ ions between the nanorods in the ZIB assembly allows for a high volume of $Zn^{2+}$ in the nanoassembly. The consequence of this is further discussed in Example 5.

Figure 1B:
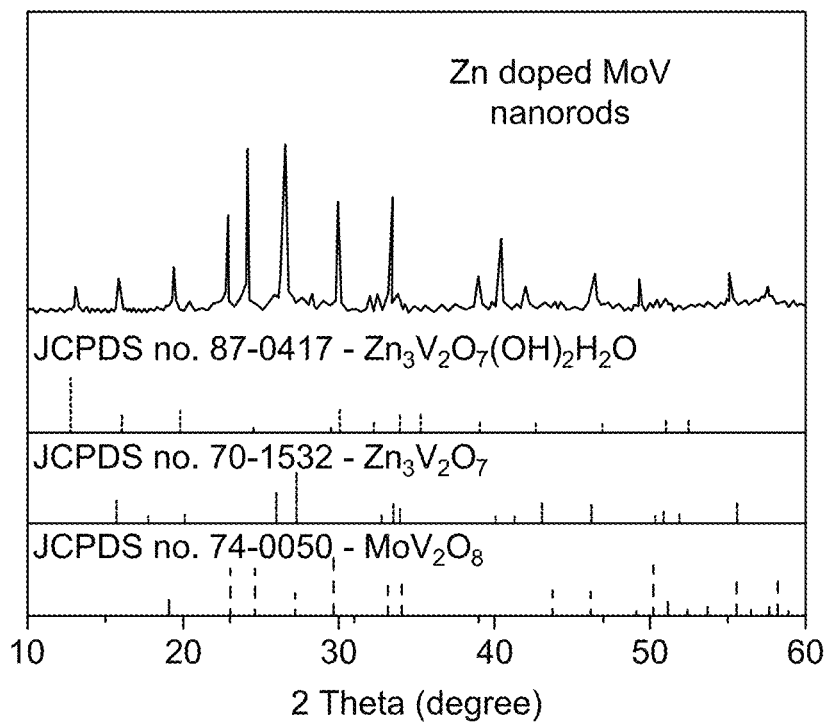
FIG. 1B shows an X-ray diffraction (XRD) image of the ZMV nanorods, according to certain embodiments.

FIG. 1B depicts X-ray diffraction results indicating the formation of a hybrid system Zn intercalated Mo—V as all the diffraction peaks of sample agrees with the standard results of JCPDS cards no. 87-0417, 70-1532, and 74-0050. The Zn doping on octahedron Mo—V are accomplished by sharing two bridging oxygen atoms implying that no phase transformation might occurred during Zn attachment.

Figure 1C:
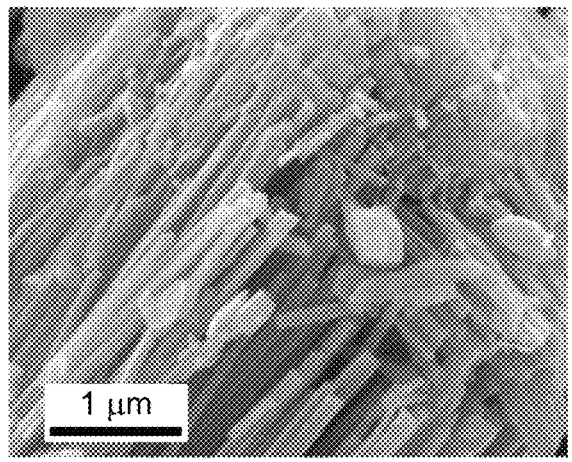
FIG. 1C shows a scanning electron microscope (SEM) image of the ZMV nanorods with a resolution of 1 um, according to certain embodiments.
Figure 1D:
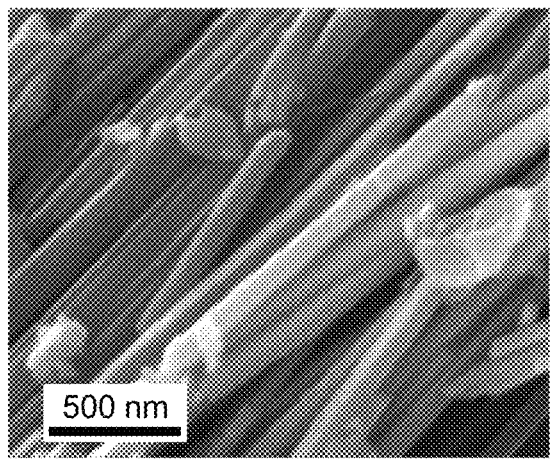
FIG. 1D shows a SEM image of the ZMV nanorods with a resolution of 500 nm, according to certain embodiments.
Figure 1E:
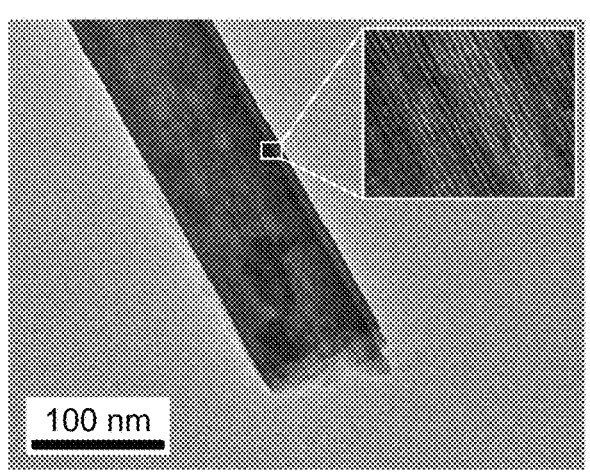
FIG. 1E shows a high-resolution transmission electron microscopic (HRTEM) image of the ZMV nanorods, according to certain embodiments.
Figure 1F:
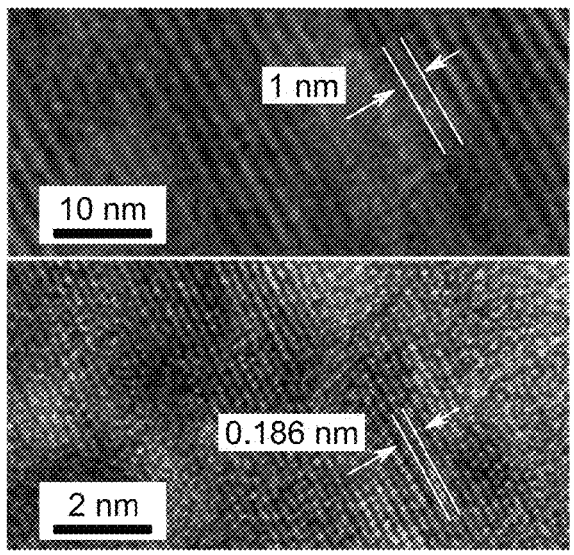
FIG. 1F shows a HRTEM image of the ZMV nanorods with lattice d-spacing at different magnifications, according to certain embodiments.
Figure 1G:
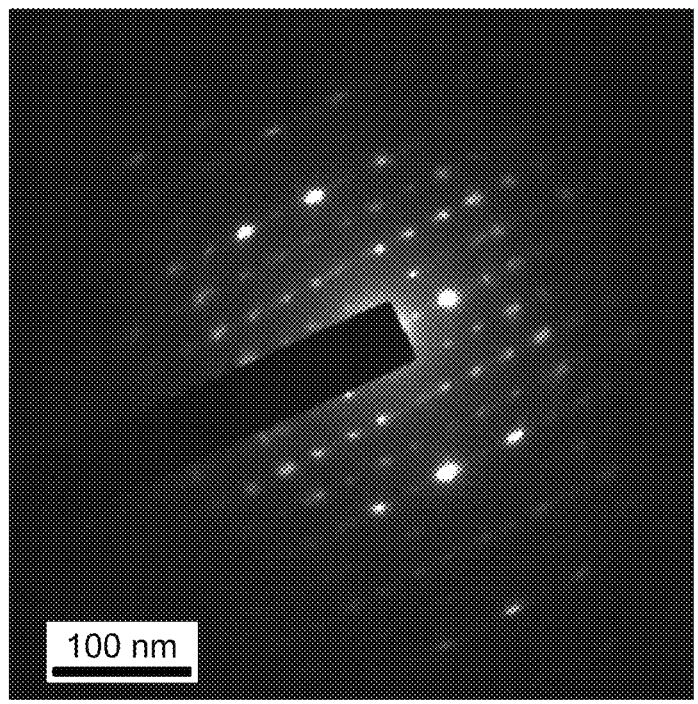
FIG. 1G shows a selected area electron diffraction (SAED) pattern of the ZMV nanorods, according to certain embodiments.
Figure 1H:
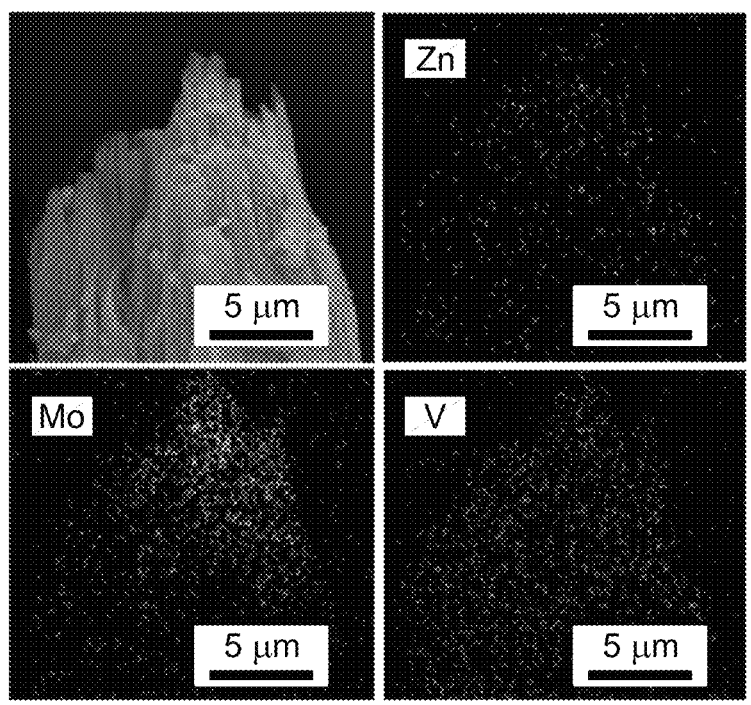
FIG. 1H shows elemental mapping images of Zn, Mo, and V, in the ZMV nanorods, according to certain embodiments.
Figure 8:
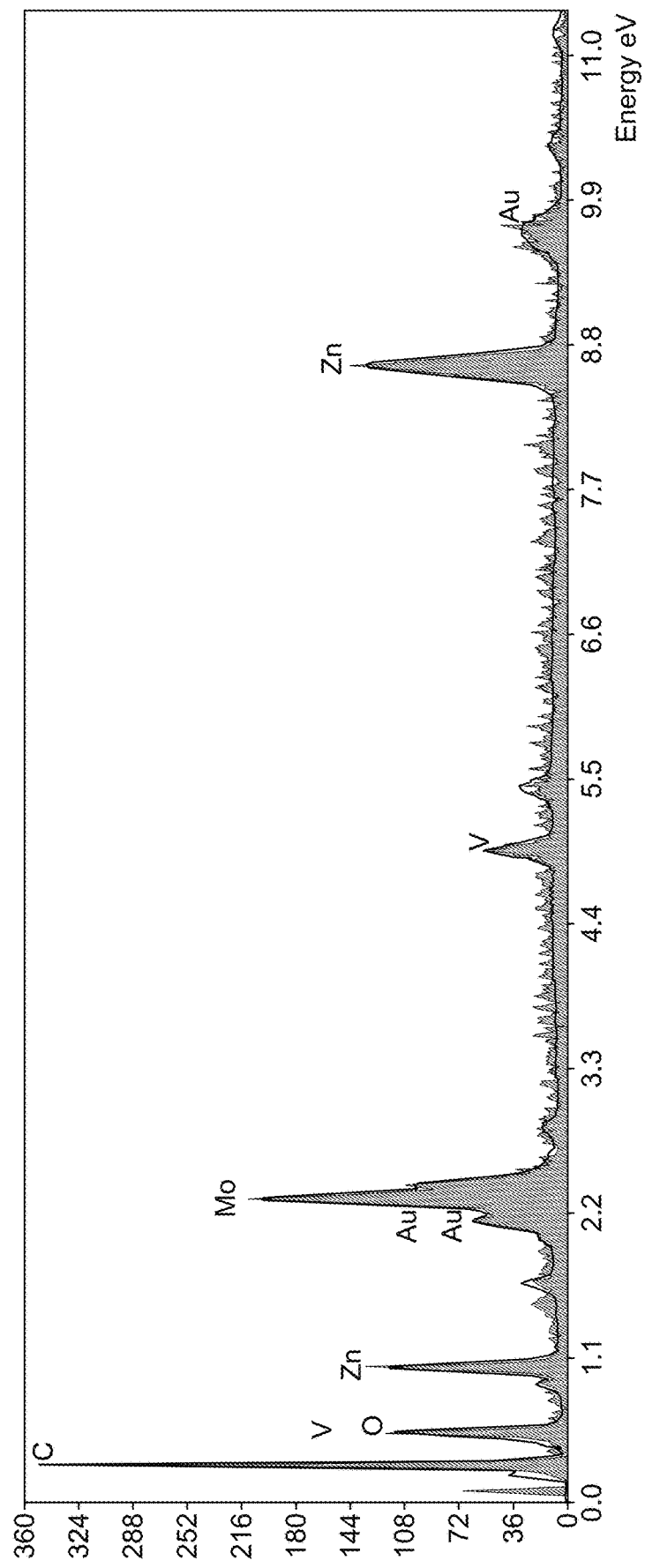
FIG. 8 shows an Energy-dispersive X-ray spectroscopy (EDX) spectrum of the ZMV nanorods, according to certain embodiments.

The structure of the prepared nanorods was examined by SEM showing a homogeneous distribution of uniform nanorods with the same directionality (FIGS. 1C and 1D). FIG. 1E shows high resolution TEM (HRTEM) analysis of a single ZMV nanorod with an average diameter of 80 nm and interplanar spaces clearly visible in the FIG. 1E inset. In addition, detailed HRTEM images show high crystallinity nanorods with a well matching lattice d-spacing of about 1 nm and 0.186 nm at different magnifications (FIG. 1F). Selected area diffraction (SAED) was obtained from a single nanorod which shows plane (040) of ZMV crystal displayed in FIG. 1G. Furthermore, EDX spectroscopy (FIG. 8) analysis demonstrates the elemental mapping and homogeneous distribution of Zn, Mo, and V over the fabricated ZMV nanorods (FIG. 1H).

Figure 2A:
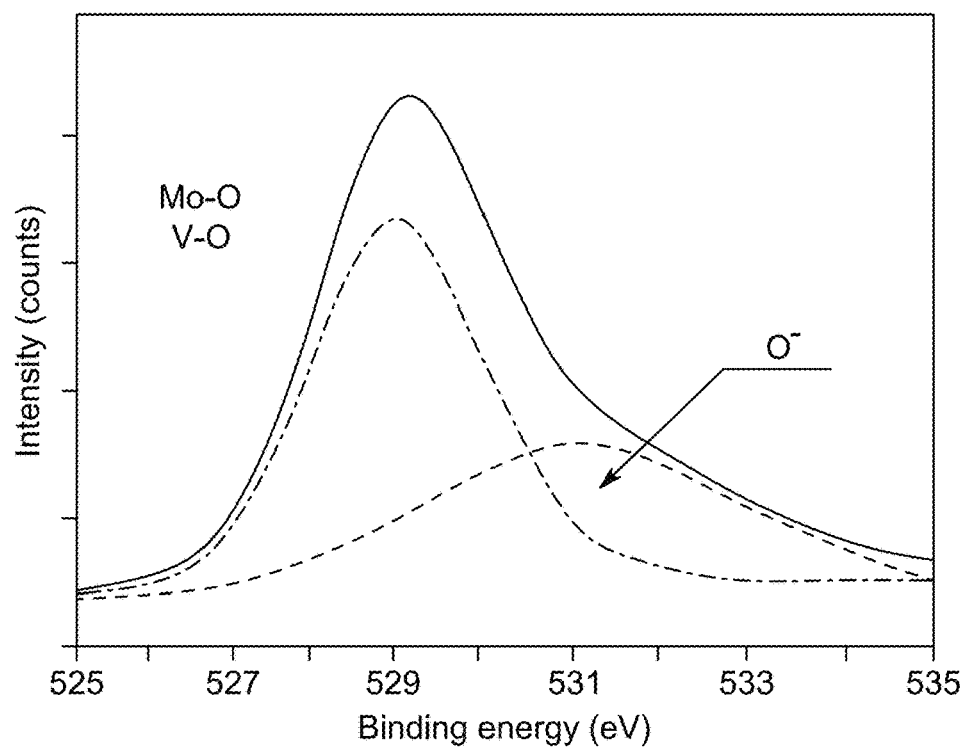
FIG. 2A shows an X-ray photoelectron spectroscopy (XPS) spectrum of the oxygen species in the ZMV nanorods, according to certain embodiments.
Figure 2B:
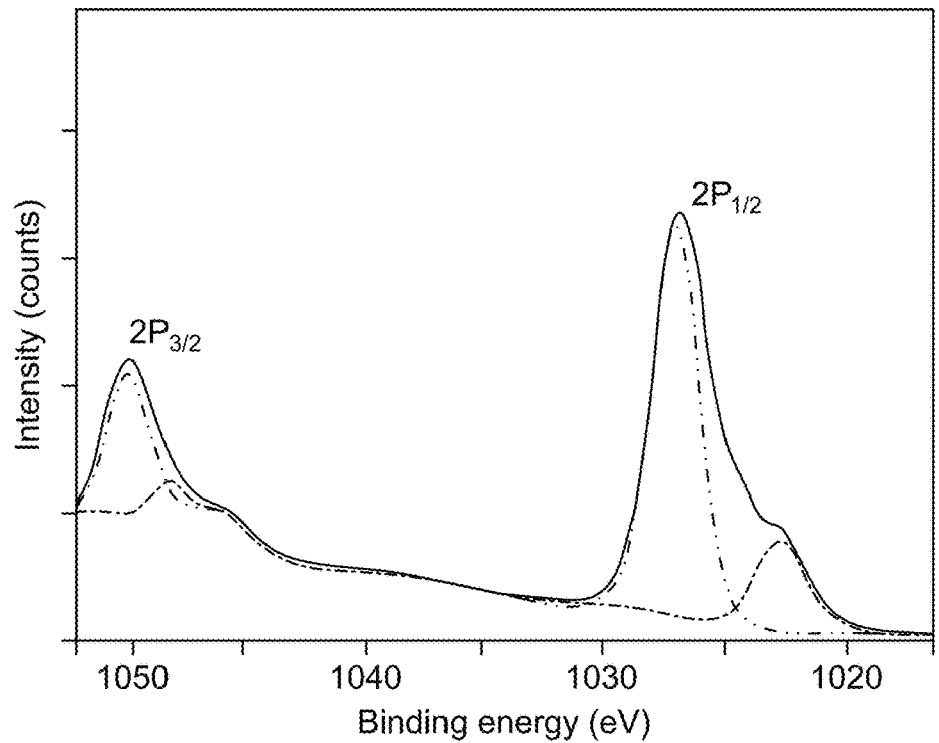
FIG. 2B shows an XPS spectrum of the zinc species in the ZMV nanorods, according to certain embodiments.
Figure 2C:
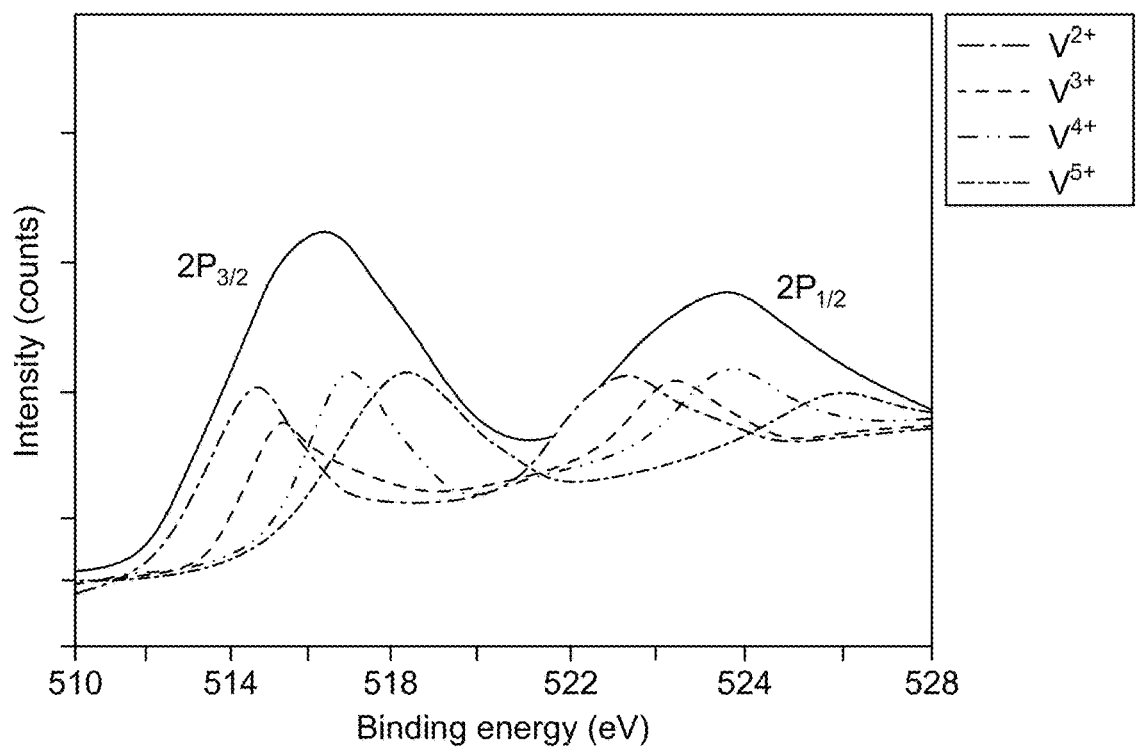
FIG. 2C shows an XPS spectrum of the vanadium species in the ZMV nanorods, according to certain embodiments.
Figure 2D:
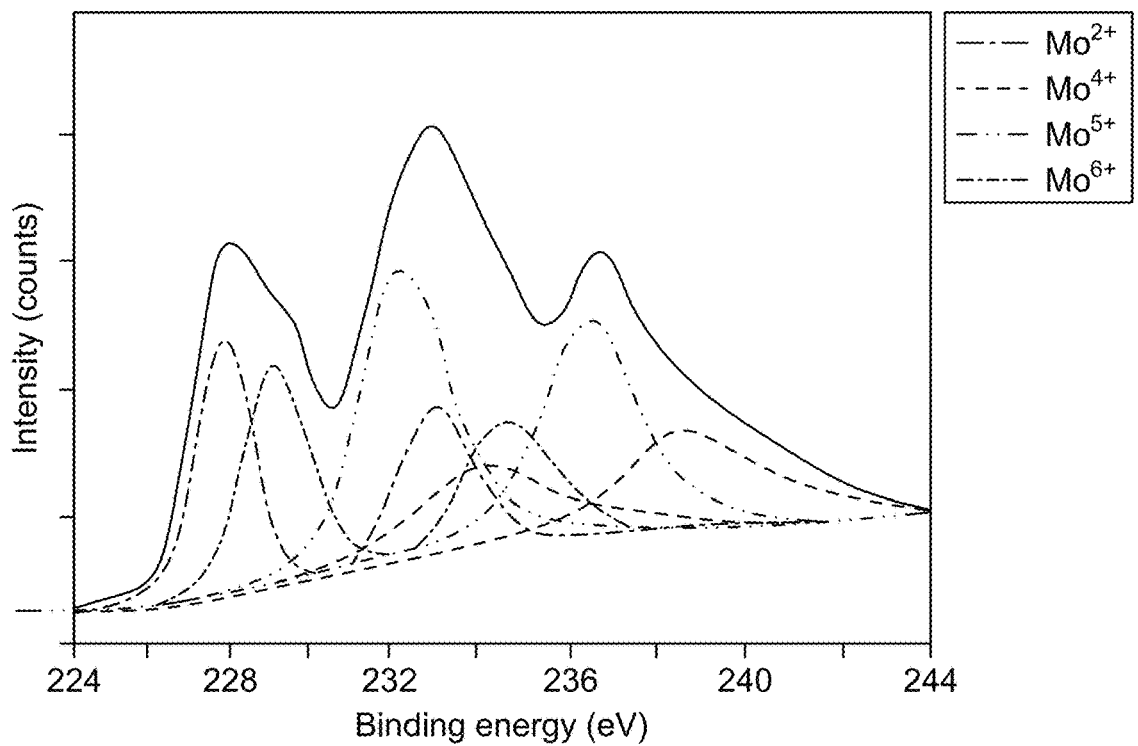
FIG. 2D shows an XPS spectrum of the molybdenum species in the ZMV nanorods, according to certain embodiments.
Figure 9:
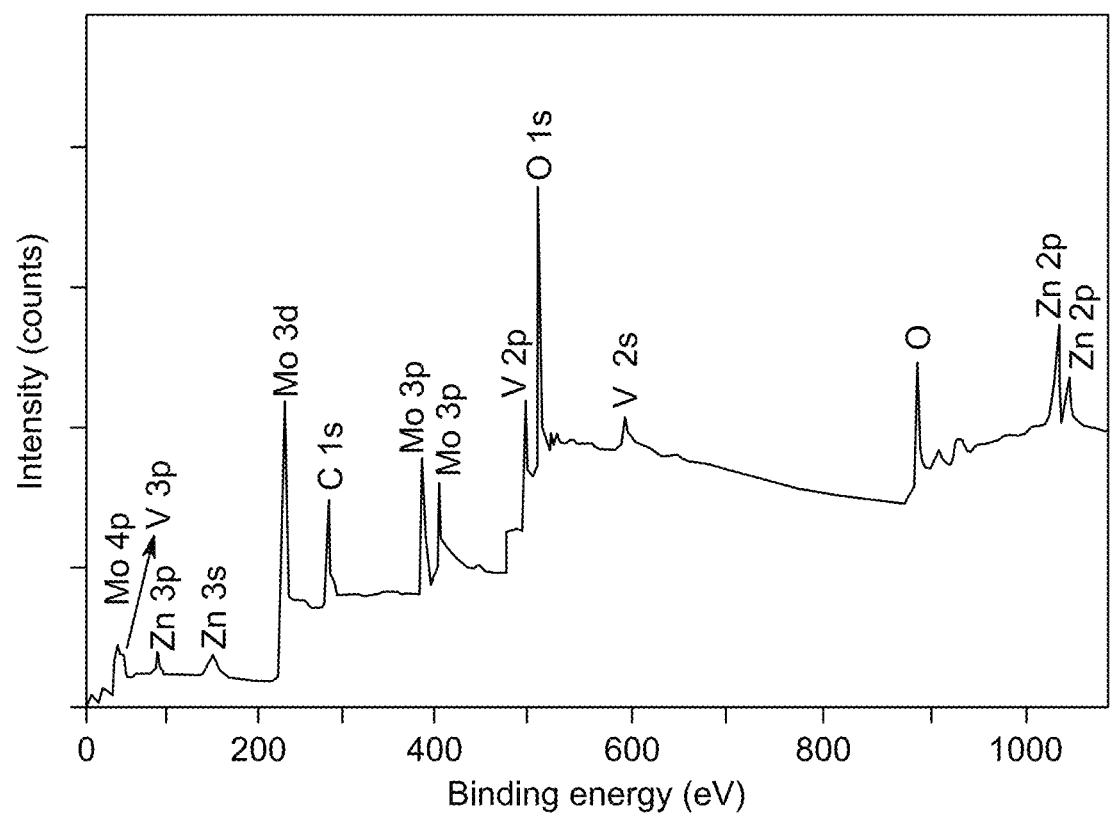
FIG. 9 shows an XPS spectrum of the ZMV nanorods, according to certain embodiments.

The chemical composition of the fabricated nanorods was characterized using X-ray photoelectron spectroscopy (XPS). The XPS survey spectra confirmed the presence of Zn, Mo, V, and O with atomic percentages of 13.9, 17.6%, 22.1%, and 46.4% respectively (FIG. 9). The high-resolution XPS spectrum of O1s is presented in FIG. 2A, highlighting the presence of Mo—O, V—O, and Zn—O chemical bonds and adsorbed OH groups on the surface of the fabricated nanorods. FIGS. 2B, C and D show the high-resolution XPS of Zn2p, V2p and Mo3d demonstrating their presence in different oxidation states which confirms to the XRD findings.

Example 5: Battery Performance Characterization

Figure 3:
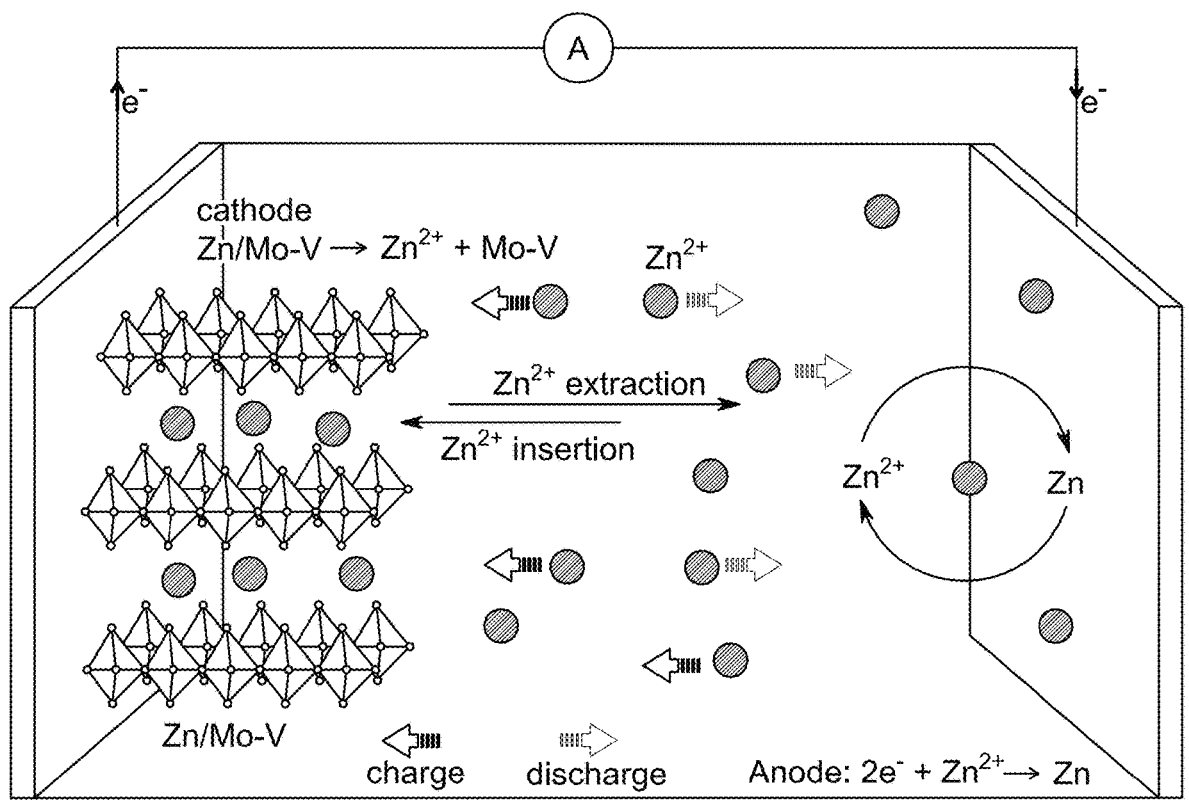
FIG. 3 shows a schematic illustration of a rechargeable zinc ion battery (ZIB), according to certain embodiments.

FIG. 3 depicts an embodiment of the rechargeable aqueous ZIB system based on a ZMV cathode, a Zn anode, and $ZnSO_4$ electrolyte. The structurally layered ZMV cathode offers a favorable environment with high reversibility, called the "redox tunable" strategy, for hydrated $Zn^{2+}$ ion intercalation (1) via oxygen bridges potentially occurring in Mo—V chemistry.

$$Zn_xMoV\text{-}yZn^{2+}\text{-}2ye^{-} \leftrightarrow MoV \quad (1)$$

Figure 4A:
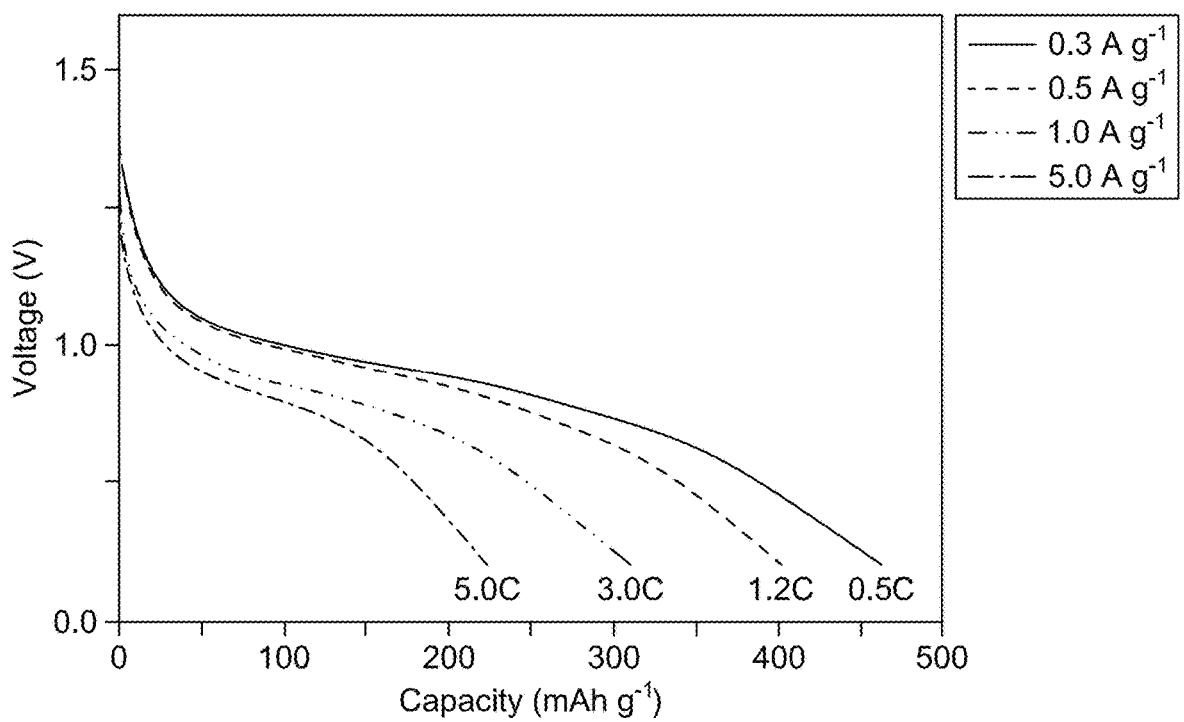
FIG. 4A shows the discharge profiles of the ZIB at different rates, according to certain embodiments.
Figure 4B:
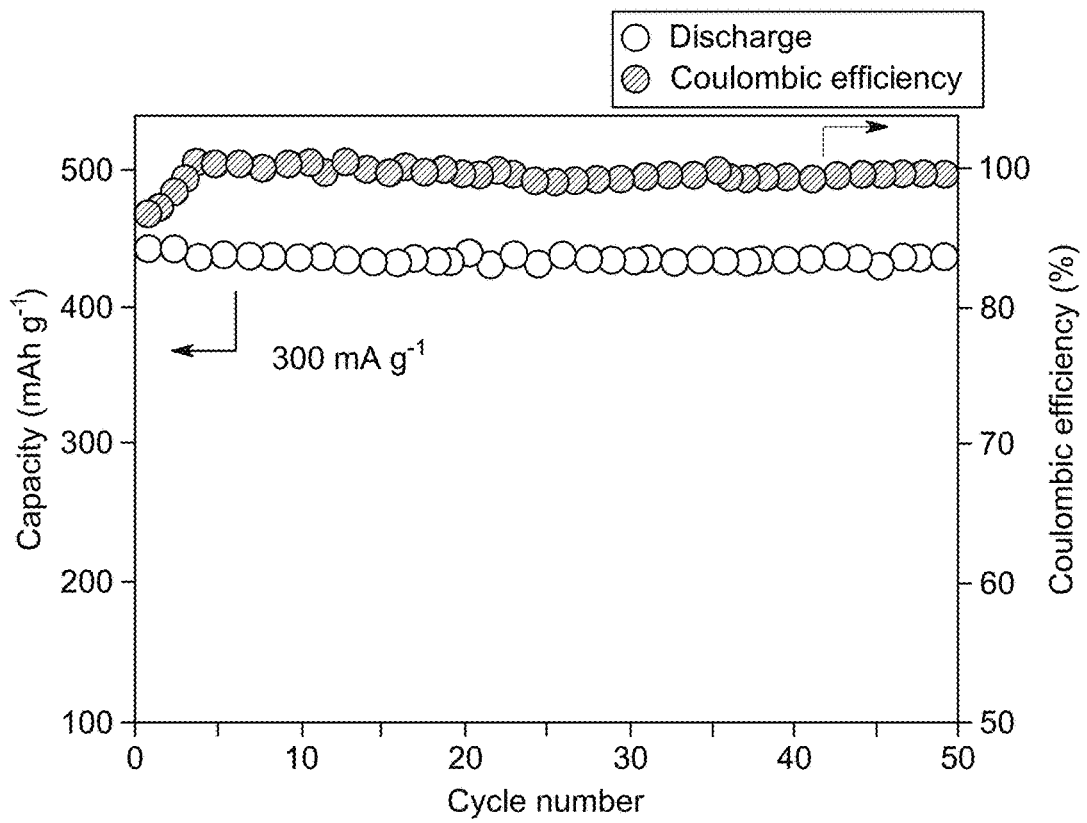
FIG. 4B shows the cyclic short-term charge-discharge at 300 mA/g of the ZIB, according to certain embodiments.
Figure 4C:
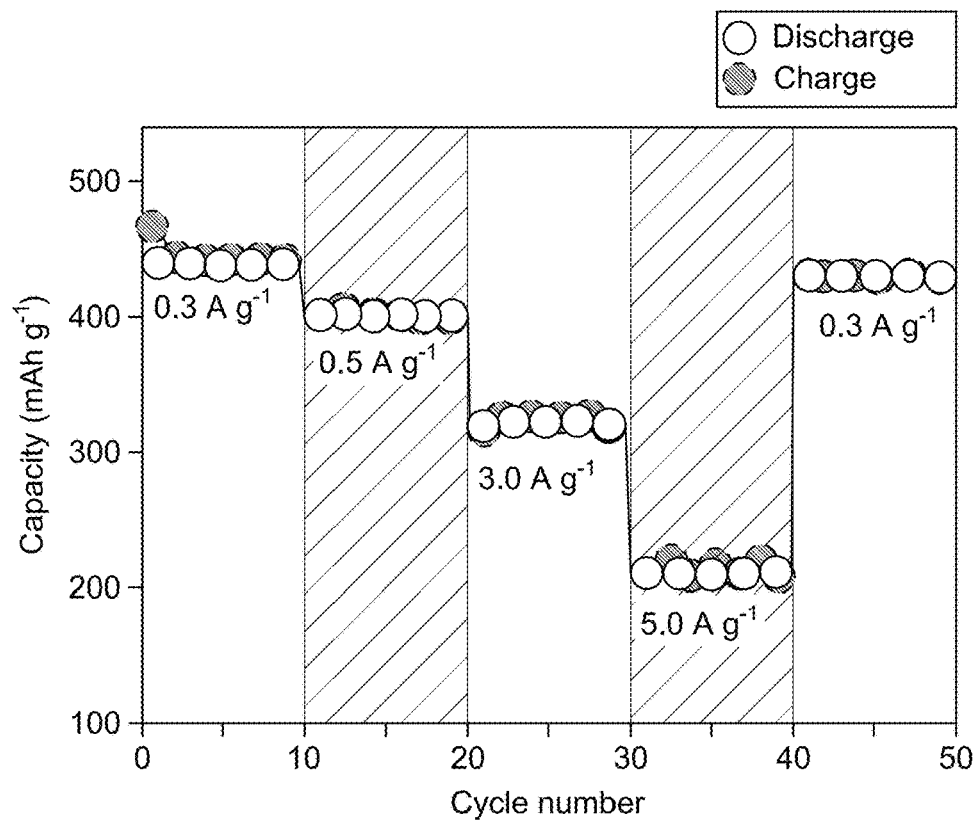
FIG. 4C shows the cyclic performance at different current rates of the ZIB, according to certain embodiments.

The electrochemical behavior of the battery was studied in a two-electrode electrochemical cell in which ZMV is used as a cathode, Zn metal is used as an anode, and aqueous $ZnSO_4$ solution as electrolyte. The discharge profile (i.e., the redox potential of $Zn^{+2}/Zn$) in V vs. the gravimetric capacity in mA $g^{-1}$ at different gravimetric current densities of the fabricated battery cell is presented in FIG. 4A. The CD profiles revealed that the fabricated battery cell provides a CD capacity of 465 mA $g^{-1}$ for the cycle achieving outstanding coulombic efficiency (CE). The cycling performance presented in FIG. 4B demonstrates negligible fading in the CE (~100%) of the fabricated battery cell after 50 cycles. Noticeably, the fabricated cell provides a sustained CD capacity ~465 mA $g^{-1}$ which is remarkably high compared to reported Zinc-based ion batteries. Furthermore, as presented in FIG. 4C, the fabricated ZIB was operated in a wide range of gravimetric current densities 0.3, 0.5, 3.0, 5.0, and again at 0.3 A $g^{-1}$ providing gravimetric capacities of 465, 420, 345, 230, and 457 mA $g^{-1}$ respectively with a well retained sloping of reversible cycles over the entire range of applied current density. Noticeably, the device delivers a reasonable gravimetric capacity ~230 mA $g^{-1}$ even at a high current density ~5 A $g^{-1}$ (~60 s for a full reversible cycle) with negligible change in its performance when it reoperated at low current.

Figure 4D:
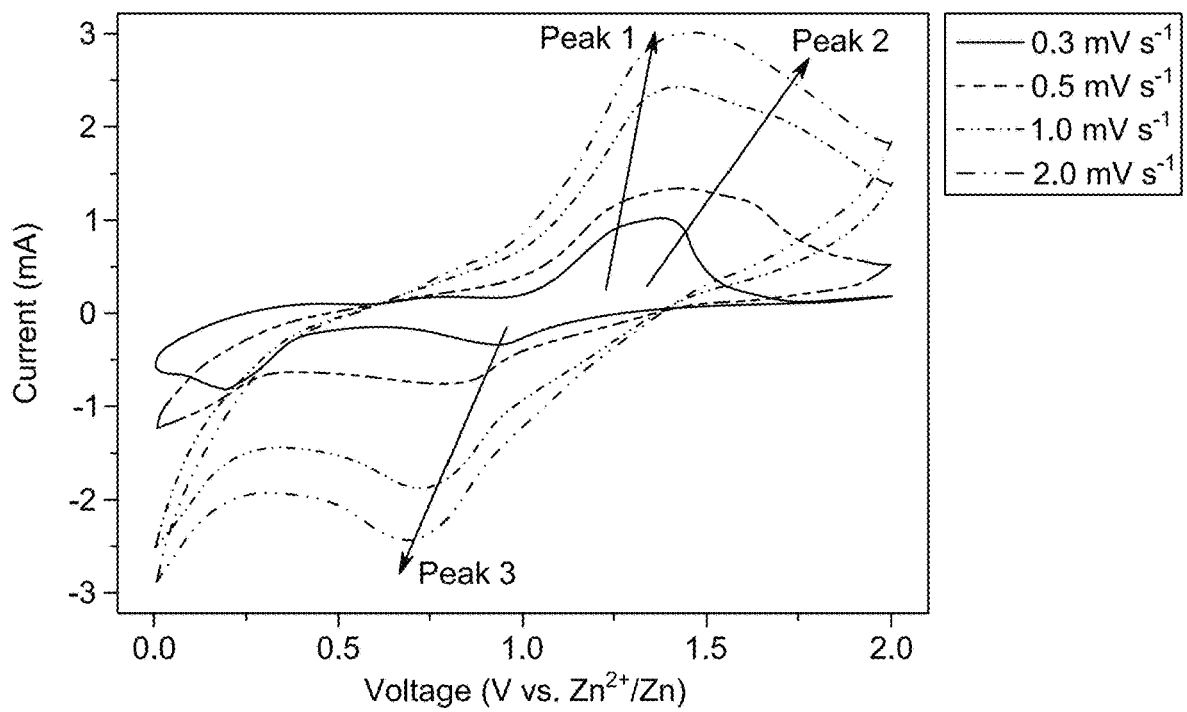
FIG. 4D shows the cyclic voltammogram (CV) from 0.3 to 2.0 mV/s of the ZIB, according to certain embodiments.
Figure 4E:
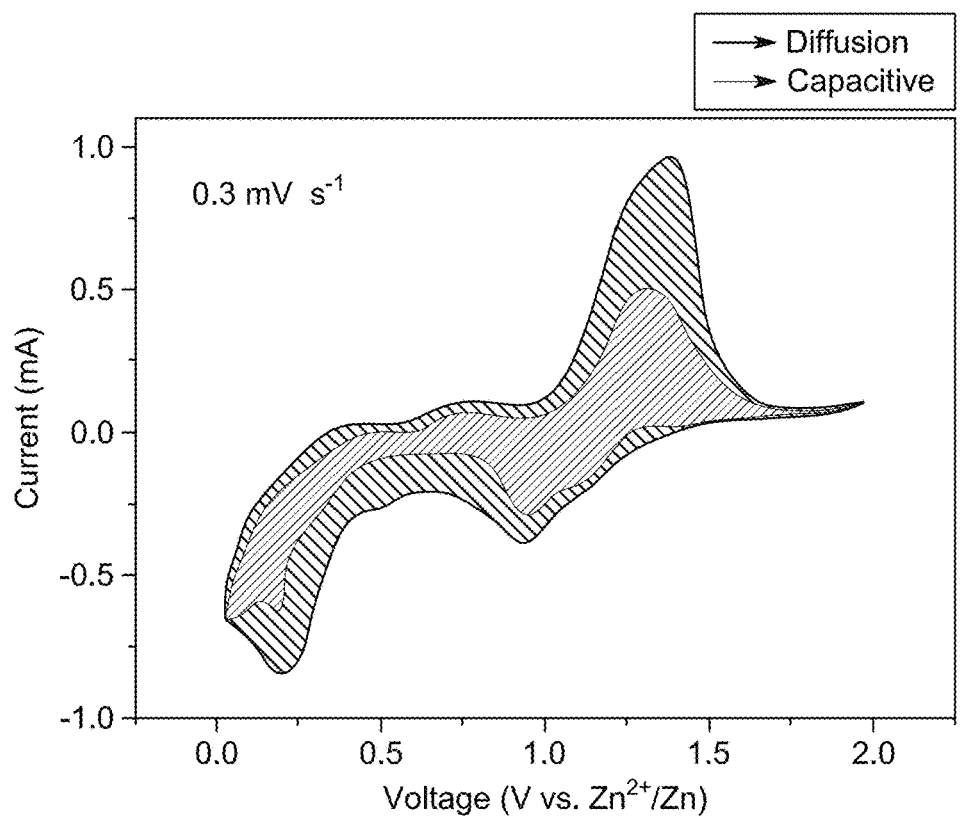
FIG. 4E shows the diffusion-capacitive performance evaluation of the ZIB, according to certain embodiments.
Figure 4F:
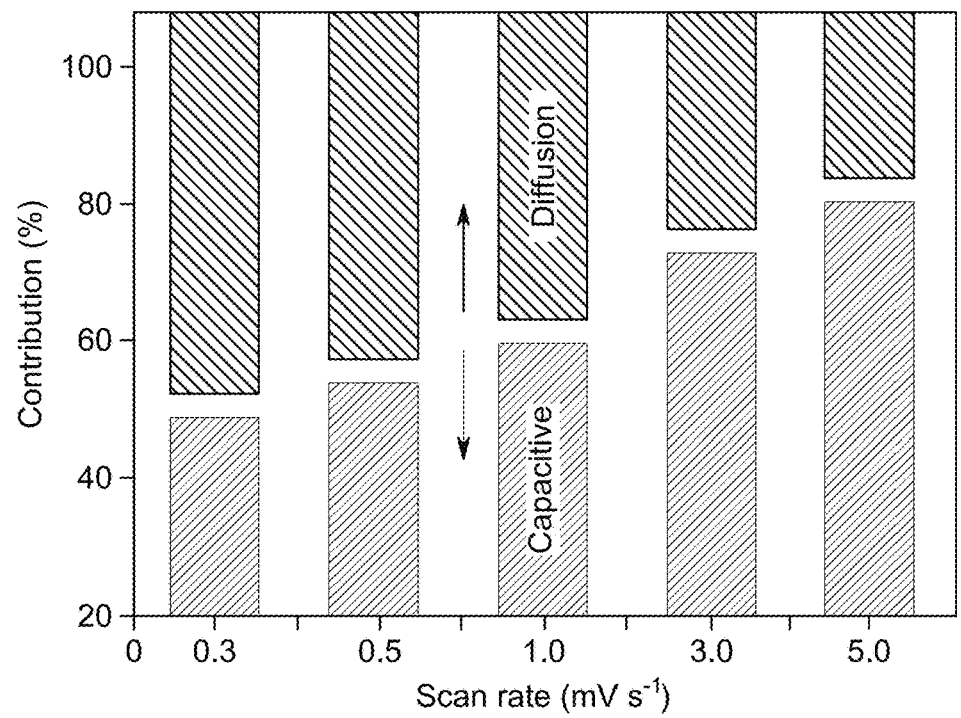
FIG. 4F shows the diffusion-capacitive contributions at different scan rates of the ZIB, according to certain embodiments.
Figure 4G:
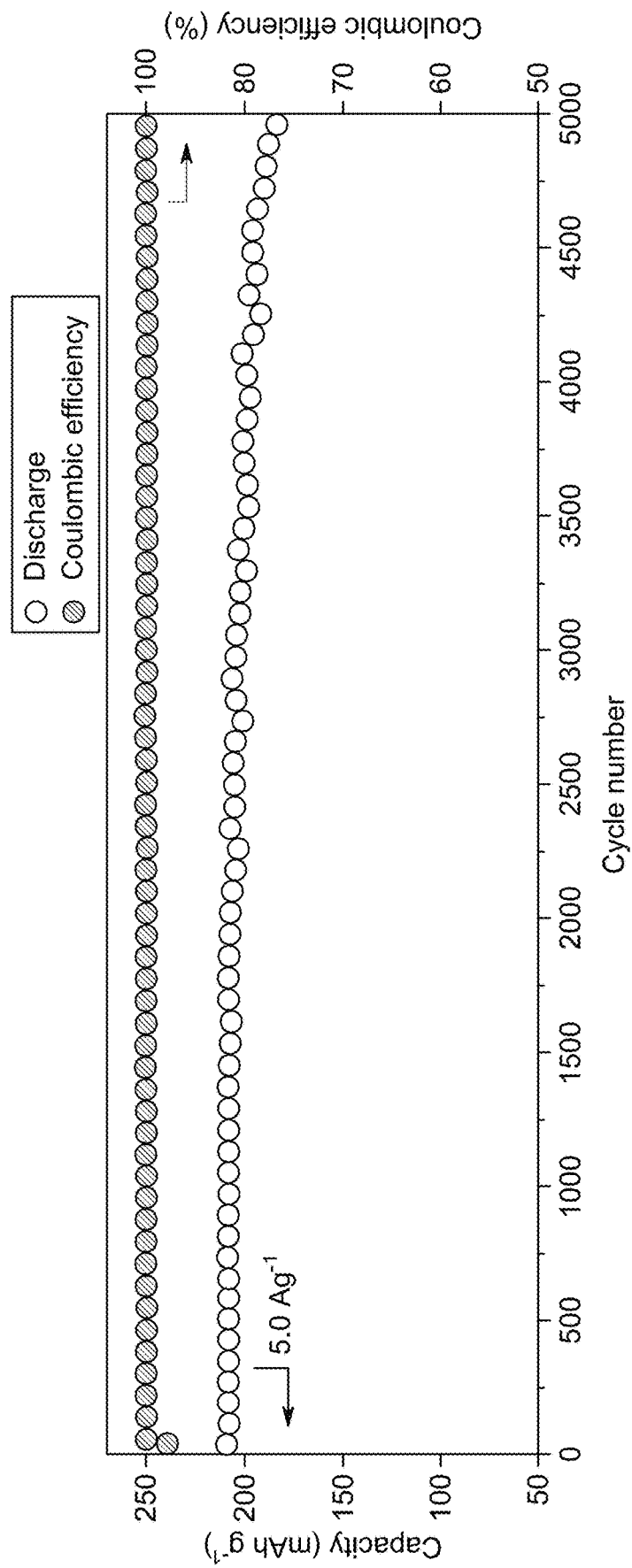
FIG. 4G shows the long-term cyclic performance at 50 A/g of the ZIB, according to certain embodiments.
Figure 4H:
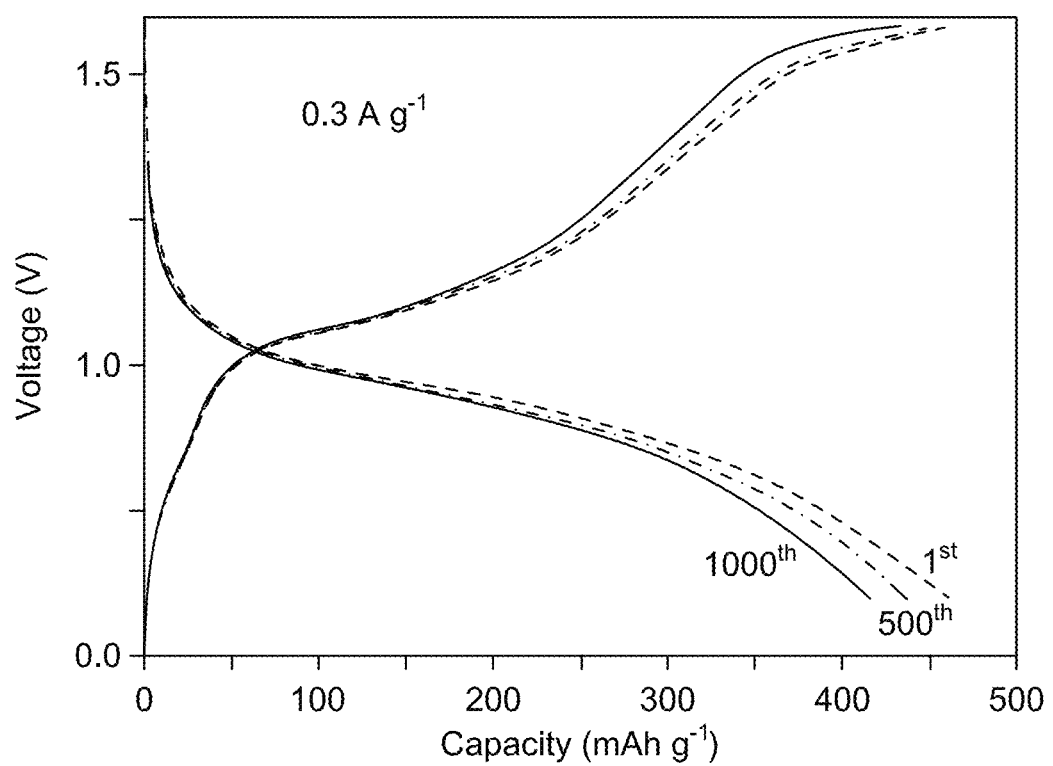
FIG. 4H shows the galvanostatic charge-discharge (GCD) curves at difference cycles of the ZIB, according to certain embodiments.

CV measurements were carried out at rates of 0.3-2.0 mV $s^{-1}$ as demonstrated by FIG. 4D to understand the electrochemical kinetics of $Zn^{+2}$ ion storage. Upon increasing the scan rate, the redox peaks were slightly shifted and become broader while the overall shape of CV profiles is maintained. In principle, the current and scan rate is given by the well-known power-law formula $i=av^b$, where i is current, v is the scan rate, a and b are constants. When b goes to 0.5 and 1.0 indicates diffusion effect and capacitive process respectively. Based on this fact, FIG. 4E highlights the hybrid behavior of the cell including $Zn^{2+}$ ion diffusion/intercalation and capacitive behavior. The b values vary from 0.65 to 0.91 for the labeled cathodic and anodic reactions. According to the following equation, $i(V)=k_1v+k_2v^{1/2}$ in which the first term represents the capacitive effect, and the second term reflects the diffusion effect, the contribution of both storage mechanisms can be estimated as indicated by FIG. 4E. As shown in FIG. 4F, the capacitive contribution dominates at high scan rates as it represents 40% of the storage mechanism at 0.3 mV $s^{-1}$ and 84% at 2.0 mV $s^{-1}$. The fabricated battery cell demonstrates outstanding stability at the high current density of 5 A $g^{-1}$ with a limited loss (10%) in its gravimetric capacity up to 5,000 cycles (FIG. 4G). This behavior is well matched with CD profiles obtained from different cycle numbers at a constant current density of 0.3 A $g^{-1}$ (FIG. 4H).

Figure 5A:
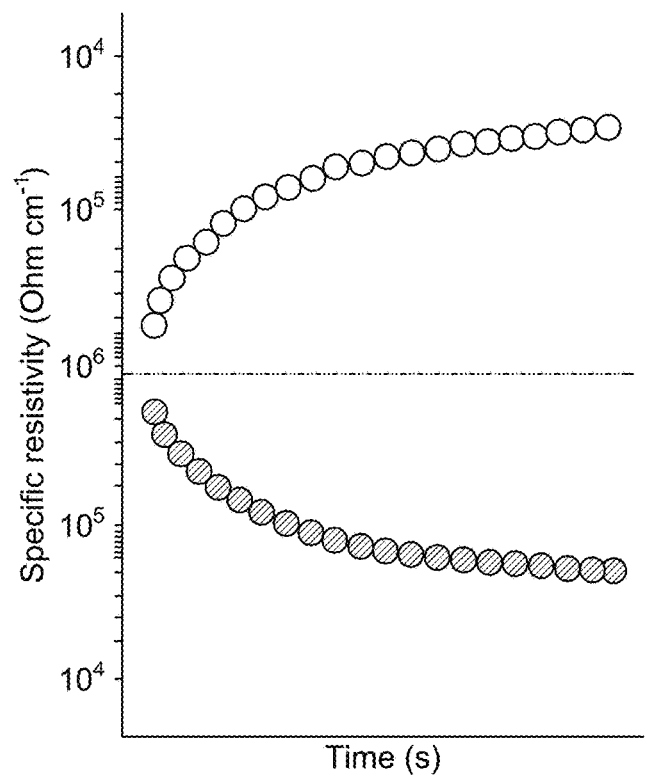
FIG. 5A shows the specific resistivity of the ZIB over time, according to certain embodiments.
Figure 5B:
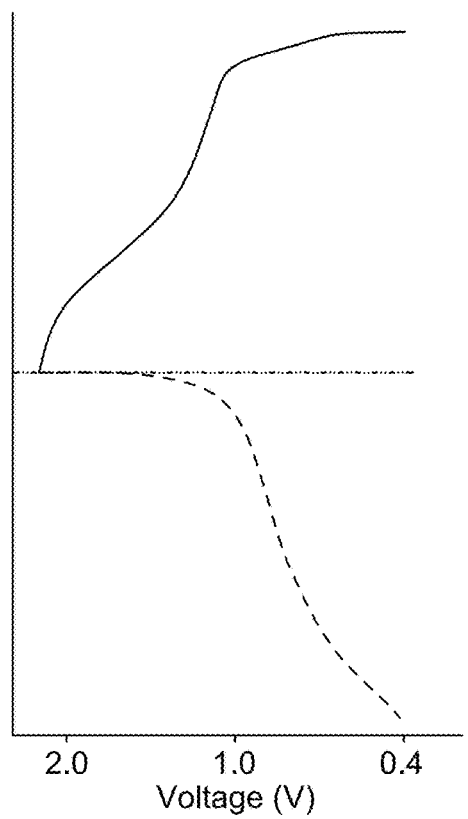
FIG. 5B shows the charge-discharge curve of the ZIB at different voltages, according to certain embodiments.
Figure 5C:
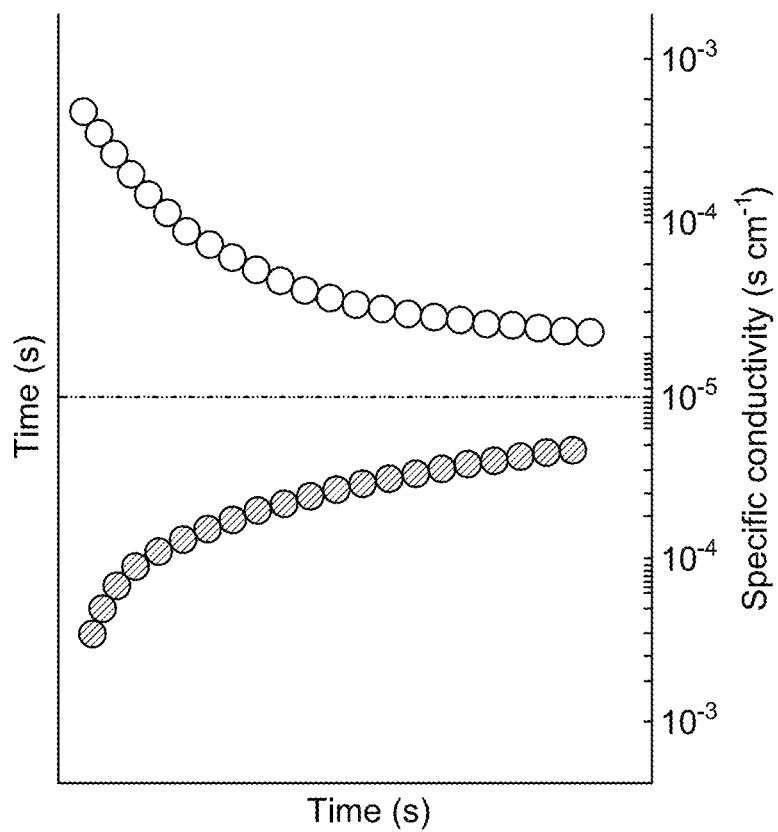
FIG. 5C shows the specific conductivity of the ZIB during charge-discharge cycles, according to certain embodiments.

FIGS. 5A-5C show the changes of the specific resistance and conductivity of the ZIB during CD with respect to time and voltage. During battery CD cycles, the internal resistance of battery illustrates a time-varying nonlinear relationship between electric potential and state of charge due to activation polarization and concentration polarizations. Clearly, the resistance of the cell increases during charging that could be explained by the accumulation of $Zn^{2+}$ ions on the surface of the electrode, resulting in the depletion of these ions in the electrolyte. Conversely, the resistance of the cell decreases during discharging process.

SEM images supported by digital photographs of the Zn anode after operating for 100 and 5,000 cycles are presented in FIGS. 6A-D, and F. The SEM images showed dendrite formation on the anode even with short CD cycles as shown in FIG. 6A obtained from the Zn anode provided in FIG. 6D. The electro-oxidation of Zn metal causes formation of $Zn^{2+}(aq)$ and two electrons are transferred to the cathode. The high $OH^-$ concentration in the electrolyte transforms $Zn^{2+}$ ions into $Zn(OH)_4^{2-}$ complex ionic structures on the anode surface (2). Complex ionic structures formed on the anode surface diffuse into the electrolyte due to the concentration gradient and cause active material losses (anode dissolution). FIG. 6C shows the SEM image obtained from a section of the anode after 5,000 CD cycles revealing anode dissolution supported by the digital photo of FIG. 6F. In addition, at the points where the diffusion reaches the saturation, it can precipitate as ZnO and form dendritic morphologies on the anode surface (3) (FIG. 6E). The reactions occurring on the anode surface are summarized below:

$$Zn^{2+}(aq) + 4OH^-(aq) \rightarrow Zn(OH)_4^{2-}(aq) \quad (2)$$

$$Zn(OH)_4^{2-}(aq) \rightarrow ZnO(s) + H_2O + 2OH^-(aq) \quad (3)$$

By employing salts such as $ZnSO_4$ that offer mildly acidic aqueous solutions, reversible Zn plating/stripping becomes possible to a certain extent. Thus, recharging the battery becomes much easier and the stripping reaction during discharge (4) and the plating reaction during charging (5) of the ZIB battery occur as the following chemical reactions:

$$\text{Stripping:} Zn(s) \rightarrow Zn^{2+}(aq) + 2e^- \quad (4)$$

$$\text{Plating:} Zn^{2+}(aq) + 2e^- \rightarrow Zn(s) \quad (5)$$

Figures 7A, 7B:
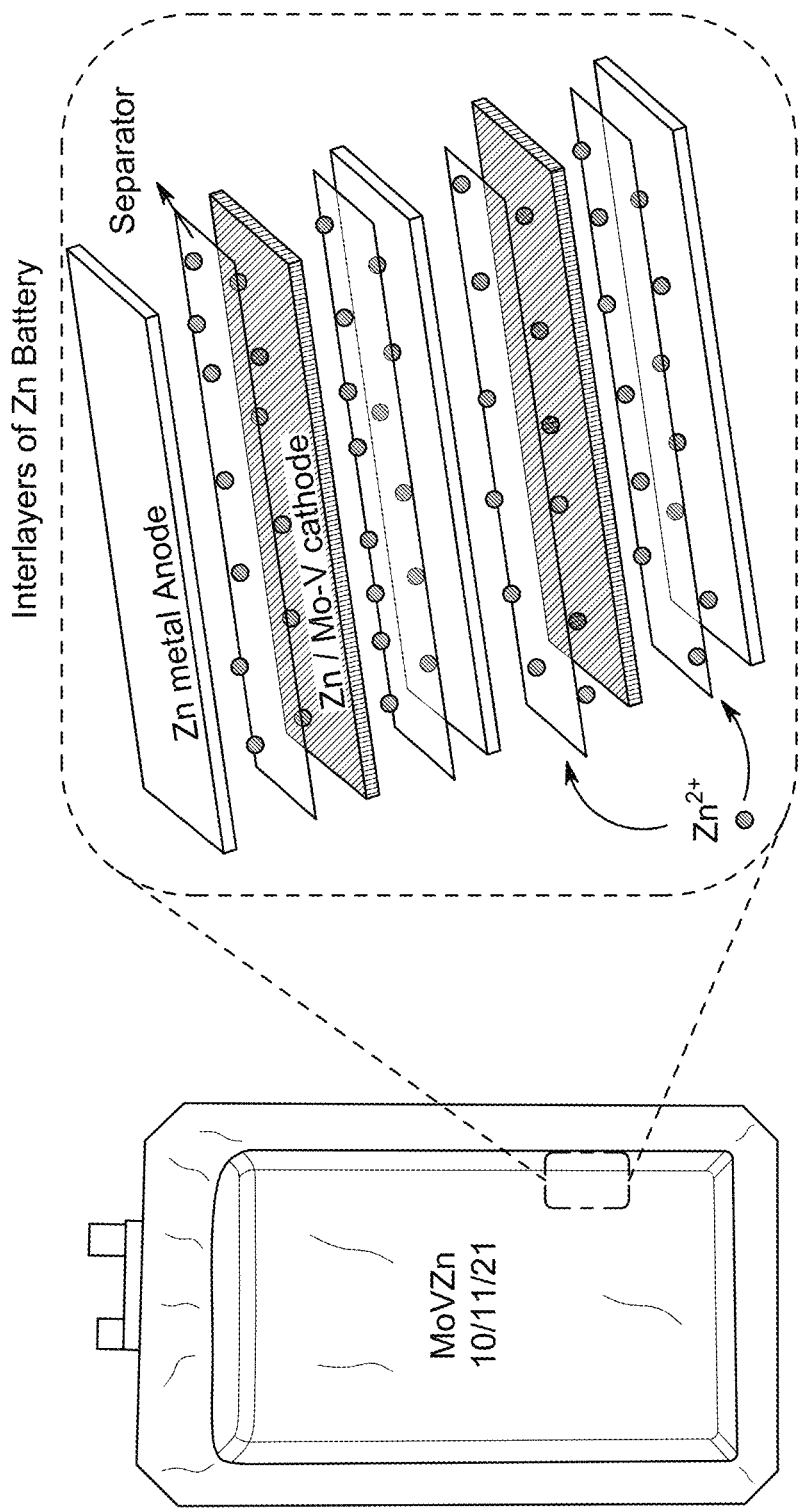
FIG. 7A shows a digital photograph of a packaged assembled battery cell with one or more ZIB batteries, according to certain embodiments.
FIG. 7B shows a schematic representation of an assembled battery cell, according to certain embodiments.
Figure 7C:
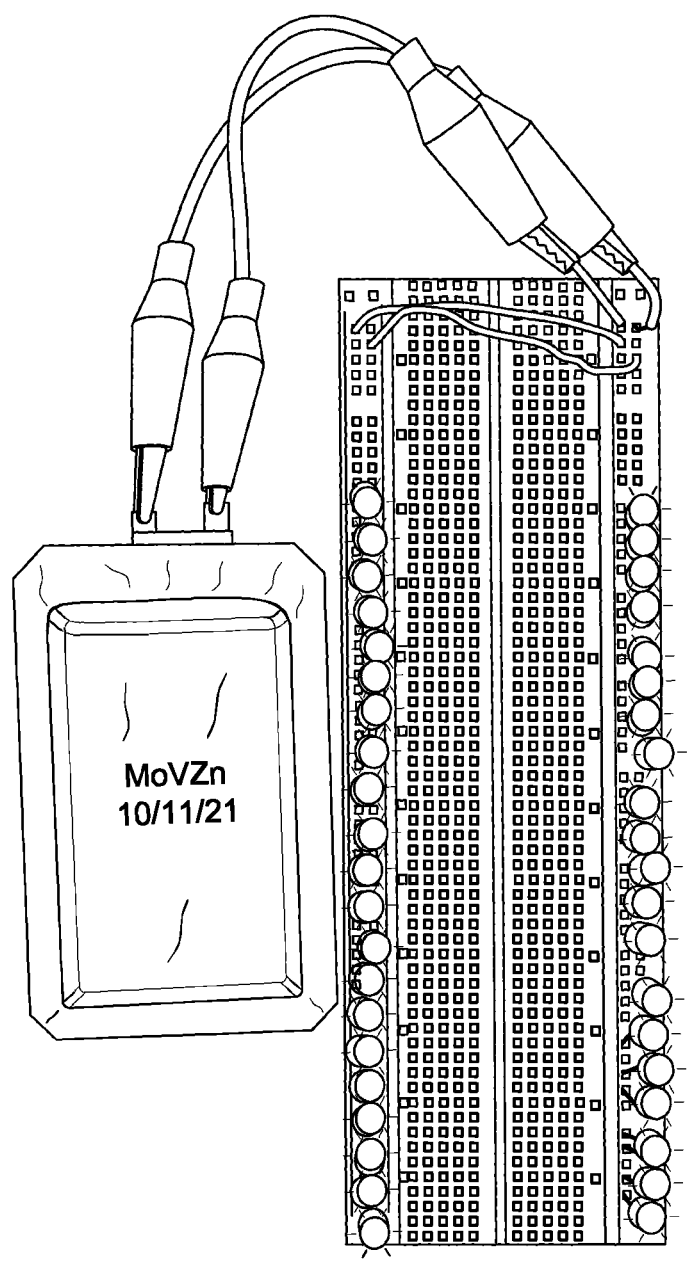
FIG. 7C shows a group of light emitting diodes (LEDs) (40 pieces) powered by a packaged ZIB, according to certain embodiments.
Figure 7D:
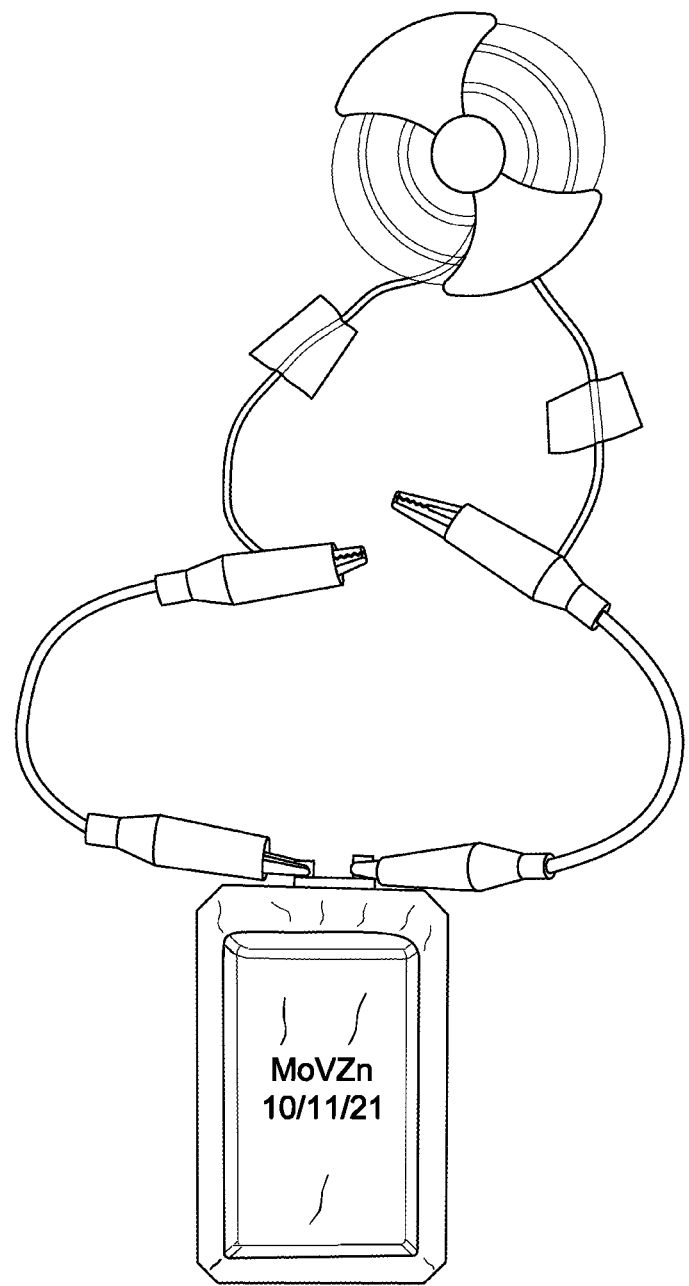
FIG. 7D shows a motor fan powered by a packaged ZIB, according to certain embodiments.

A pouch cell of the redox tunable ZMV cathode-based ZIB battery cell was produced to demonstrate the possibility of large-scale application (FIG. 7A). The configuration of multilayered stacking of $Zn/ZnSO_4/ZMV$ is shown in FIG. 7B. The ZMV cathode-based ZIB cell was tested by a group of LEDs (40 pieces) connected in series (FIG. 7C). In addition, the same ZIB device is used to power a motor fan as shown in FIG. 7D. Recent approaches and various strategies for electrode and device development applied in ZIB are promising, however, dendrite formation and hydrogen evolution are still a challenge.

A highly stable cathode with Zn doped Mo—V oxide nanorods for use in multivalent energy storage in rechargeable Zn-ion batteries with an aqueous electrolyte is reported. The highly porous intercalation type cathode material increased the active sites for redox reactions resulting in higher cycle stability and storage capacity. A reversible and uniform Zn electroplating at the interface of the anode surface works consistently with the cathode. Zn doped ZMV cathode can be scaled up to assemble a pouch cell.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A nanocomposite electrode, comprising:
    a substrate;
    a binding compound;
    a conductive additive; and
    zinc doped molybdenum vanadium oxide (ZMV) nanorods;
    wherein the substrate is at least partially coated on a first side with a mixture comprising the ZMV nanorods, the binding compound, and the conductive additive,
    wherein the ZMV nanorods have 10-20 atomic percent (at %) Zn, 15-25 at % Mo, 20-30 at % V, and 40-50 at % O, based on the total number of atoms in the ZMV nanorods.

2. The nanocomposite electrode of claim 1, wherein the ZMV nanorods have an average diameter of 10-150 nm.

3. The nanocomposite electrode of claim 1, wherein the ZMV nanorods have an average diameter of 50-100 nm.

4. The nanocomposite electrode of claim 1, wherein the ZMV nanorods have a length of at least 0.5 um.

5. The nanocomposite electrode of claim 1, wherein the ZMV nanorods have a length of 0.5-100 um.

6. The nanocomposite electrode of claim 1, wherein the ZMV nanorods are oriented lengthwise parallel to each other.

7. The nanocomposite electrode of claim 1, wherein the mixture comprises:
    1-20 wt. % of the binding compound;
    10-30 wt. % of the conductive additive; and
    60-80 wt. % of the ZMV nanorods, based on the total weight of the ZMV nanorods, the binding compound, and the conductive additive.

8. The nanocomposite electrode of claim 1, wherein the substrate is made from at least one material selected from the group consisting of stainless steel, aluminum, nickel, copper, platinum, zinc, tungsten, and titanium.

9. The nanocomposite electrode of claim 1, wherein the binding compound is at least one selected from the group consisting of polyvinylidene fluoride and N-methyl pyrrolidone.

10. The nanocomposite electrode of claim 1, wherein the conductive additive is at least one selected from the group consisting of graphite, activated carbon, reduced graphene oxide, carbon nanotubes, carbon nanofibers, and carbon black.

11. A battery comprising the nanocomposite electrode of claim 1,
    wherein the battery comprises:
    an electrolyte; and
    an anode;
    wherein the nanocomposite electrode is a cathode,
    wherein the electrolyte is an aqueous solution of a zinc salt,
    wherein the anode is zinc metal,
    wherein the nanocomposite electrode and anode form a layered structure with the first side of the nanocomposite electrode facing inward towards the anode, and
    wherein the electrolyte is between and in direct contact with the first side of the nanocomposite electrode and the anode.

12. The battery of claim 11, wherein the electrolyte has a molarity of 0.1-3 M in the aqueous solution.

13. The battery of claim 11, wherein the electrolyte is at least one zinc salt selected from the group consisting of zinc sulfate, zinc carbonate, zinc nitrate, zinc acetate, and zinc halide.

14. The battery of claim 11, further comprising a separator between the first side of the nanocomposite electrode and the anode,
    wherein the separator includes the electrolyte.

15. The battery of claim 14, wherein the separator is selected from the group consisting of a glass fiber separator, a polyethylene separator, a polypropylene separator and a polyester fiber separator.

16. The battery of claim 11, having a gravimetric capacitance of 400-500 mAh/g at 0.1-1 A/g.

17. The battery of claim 16, wherein at least 90% of the gravimetric capacitance is maintained after 5,000 charge-discharge cycles.

18. A battery cell, comprising 2-10 of the batteries of claim 11 connected in parallel and/or series.

* * * * *